(12) United States Patent
Morris

(10) Patent No.: US 11,674,802 B1
(45) Date of Patent: *Jun. 13, 2023

(54) SENSOR ROD ASSEMBLY FOR MEASURING ELEVATIONS

(71) Applicant: Laser Elevations, LLC, Bellevue, NE (US)

(72) Inventor: Andrew Morris, Bellevue, NE (US)

(73) Assignee: Laser Elevations, LLC, Bellevue, NE (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/129,784

(22) Filed: Dec. 21, 2020

Related U.S. Application Data

(63) Continuation of application No. 15/627,340, filed on Jun. 19, 2017, now Pat. No. 10,871,373.

(60) Provisional application No. 62/351,676, filed on Jun. 17, 2016.

(51) Int. Cl.
  *G01C 15/00* (2006.01)
(52) U.S. Cl.
  CPC .................................. *G01C 15/006* (2013.01)
(58) Field of Classification Search
  CPC .............................. G01C 15/006; G01C 15/00
  See application file for complete search history.

(56) References Cited

U.S. PATENT DOCUMENTS

| | | | |
|---|---|---|---|
| 3,649,122 A | 3/1972 | Holtz | |
| 3,894,230 A | 7/1975 | Rorden et al. | |
| 4,005,388 A | 1/1977 | Morley et al. | |
| 4,029,415 A | 6/1977 | Johnson | |
| 4,054,385 A | 10/1977 | Wheable | |
| D273,788 S | 5/1984 | Ault | |
| 4,673,287 A | 6/1987 | Rickus | |
| 4,693,598 A | 9/1987 | Sehr | |
| 4,730,920 A | 3/1988 | Schlemmer et al. | |
| D297,950 S | 10/1988 | Yubisui et al. | |
| 4,820,041 A | 4/1989 | Davidson et al. | |
| 4,830,489 A | 5/1989 | Cain et al. | |

(Continued)

FOREIGN PATENT DOCUMENTS

DE 202014100454 U1 2/2014

OTHER PUBLICATIONS

PCT International Search Report and Written Opinion for International Application No. PCT/US2021/34898 dated Aug. 24, 2021, 20 pages.

*Primary Examiner* — Tung S Lau
(74) *Attorney, Agent, or Firm* — Suiter Swantz pc llo

(57) ABSTRACT

The sensor rod assembly includes a rod and a plurality of sensor arrays disposed on the rod. Each sensor array includes a plurality of sensor units, where each sensor unit includes a plurality of sensor devices. The sensor rod assembly includes detection circuitry coupled to the plurality of sensor devices. The detection circuitry is disposed on the rod. The detection circuitry includes a plurality of detection circuits. A particular detection circuit receives an output of a particular sensor device. The sensor rod assembly includes a user interface and a controller. The controller includes one or more processors configured to receive one or more detection signals from the detection circuitry, and determine a position of a laser beam incident on the plurality of sensor arrays based on the received one or more detection signals from the detection circuitry.

24 Claims, 20 Drawing Sheets

(56) References Cited

U.S. PATENT DOCUMENTS

| | | | |
|---|---|---|---|
| D307,289 S | 4/1990 | Sakaguchi et al. | |
| 5,030,840 A | 7/1991 | Sommen | |
| D345,147 S | 3/1994 | Fukutake et al. | |
| D356,299 S | 3/1995 | Hamilton et al. | |
| 5,801,834 A * | 9/1998 | Danielson | G01B 5/0025 356/620 |
| 6,302,355 B1 | 10/2001 | Sallee et al. | |
| D478,824 S | 8/2003 | Concari | |
| D484,917 S | 1/2004 | Hunt et al. | |
| 7,012,237 B1 | 3/2006 | Ake | |
| 7,019,278 B2 | 3/2006 | Douglas | |
| 7,030,361 B2 | 4/2006 | Douglas | |
| 7,190,439 B2 | 3/2007 | Burkhart, Jr. | |
| D540,268 S | 4/2007 | Derocher et al. | |
| 7,323,673 B1 | 1/2008 | Ake et al. | |
| D571,237 S | 6/2008 | Hersey et al. | |
| 7,385,168 B2 | 6/2008 | Cartlidge et al. | |
| 7,414,704 B1 | 8/2008 | Nau | |
| D577,299 S | 9/2008 | Hersey et al. | |
| D578,416 S | 10/2008 | Concari | |
| D589,826 S | 4/2009 | Kiesel | |
| 7,633,634 B2 * | 12/2009 | Spalding | G01B 11/27 356/638 |
| 8,044,335 B2 | 10/2011 | Katayama | |
| 8,132,802 B2 * | 3/2012 | Kolodge | G01B 11/2433 356/639 |
| D687,726 S | 8/2013 | Aglassinger | |
| D688,575 S | 8/2013 | Kokkonen et al. | |
| D742,858 S | 11/2015 | Morisawa | |
| 9,277,206 B1 | 3/2016 | Lloyd et al. | |
| D767,657 S | 9/2016 | Fukunaga et al. | |
| D778,264 S | 2/2017 | Stapelbroek et al. | |
| 9,618,619 B2 * | 4/2017 | Rezk | G01S 7/497 |
| 10,119,816 B2 * | 11/2018 | Slotwinski | G01S 7/491 |
| D857,663 S | 8/2019 | Knie | |
| D887,290 S | 6/2020 | Ranieri | |
| 10,697,755 B1 | 6/2020 | Peters et al. | |
| 10,871,373 B1 * | 12/2020 | Morris | G01C 15/006 |
| D967,420 S | 10/2022 | Sun | |
| 2002/0060788 A1 | 5/2002 | Ohtomo et al. | |
| 2006/0087641 A1 * | 4/2006 | Burkhart | G01C 3/08 356/5.01 |
| 2006/0111809 A1 | 5/2006 | Etter et al. | |
| 2006/0124323 A1 | 6/2006 | Glover et al. | |
| 2006/0192081 A1 | 8/2006 | Cartlidge et al. | |
| 2009/0103112 A1 * | 4/2009 | Nygaard | G01B 11/245 356/638 |
| 2009/0322540 A1 | 12/2009 | Richardson et al. | |
| 2010/0073687 A1 * | 3/2010 | Spalding | G01B 11/2425 356/625 |
| 2010/0157283 A1 | 6/2010 | Kirk et al. | |
| 2011/0315834 A1 | 12/2011 | Lukic et al. | |
| 2012/0236286 A1 | 9/2012 | Layton | |
| 2015/0268043 A1 | 9/2015 | McFadden et al. | |
| 2016/0091282 A1 | 3/2016 | Baker et al. | |
| 2016/0120414 A1 | 5/2016 | Darley et al. | |
| 2016/0180440 A1 | 6/2016 | Dibenedetto et al. | |
| 2017/0173262 A1 | 6/2017 | Veltz | |
| 2017/0347899 A1 | 12/2017 | Bhushan et al. | |
| 2018/0174420 A1 | 6/2018 | Clark et al. | |
| 2019/0313525 A1 | 10/2019 | Nagano et al. | |
| 2021/0293540 A1 | 9/2021 | Morris et al. | |

\* cited by examiner

US 11,674,802 B1

SENSOR ROD ASSEMBLY FOR MEASURING ELEVATIONS

CROSS-REFERENCE TO RELATED APPLICATIONS

The present application is related to and claims benefit of the earliest available effective filing date from the following applications: The present application constitutes a continuation of United States Patent Application entitled SENSOR ROD ASSEMBLY FOR MEASURING ELEVATIONS, filed Jun. 19, 2017, application Ser. No. 15/627,340, which is a regular (non-provisional) patent application of United States Provisional Patent Application entitled SYSTEM AND METHOD FOR MEASURING WITH AN ELEVATION ROD, filed Jun. 17, 2016, Application No. 62/351,676, which are each incorporated herein by reference in the entirety.

TECHNICAL FIELD

The present invention generally relates to measuring elevation grades, and, in particular, is directed to an electronic elevation rod for measuring elevations with a laser level.

BACKGROUND

In the construction and surveying industries, measuring elevation is a necessity to ensure a project is completed correctly both when starting new construction projects and when building additions onto a previously-constructed project. Systems for measuring elevation grades with a laser level currently known in the art require a number of components and steps. One component is the static tripod. Another component is the laser, generally attached to the tripod. Lasers are first set up at a general height within certain limits of the desired elevation. Then the laser is set to a value within an elevation range, based on sight approximation. The range of elevation is defined as between the laser elevation and the desired elevation, but not a specific value. A third component is the elevation rod, often with an attached laser reader to complement the laser. Once the laser reader registers the emitted laser beam, the value on the measuring stick may be added to or subtracted from the laser height elevation to find the desired elevation. Aside from the attached laser reader, elevations rods typically are not equipped with electronics.

As determining multiple elevations for a project site may be complicated, the equipment currently known in the art requires skilled, qualified users who have years of experience and know-how to accurately calculate elevations on a project site. Additionally, measuring elevation grades with equipment currently known in the art can be costly, with the needing to move multiple components increasing both time spent on surveying and the possibility of error in the elevation calculation. As such, it would be desirable to provide a system and method for measuring elevations that overcomes the defects described above.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

FIGS. 1A through 6 generally illustrate a sensor rod assembly 100 and a and a method for measuring and calculating elevation grades, in accordance with one or more embodiments of the present disclosure. It is noted that "elevation stick", "elevation rod", "grade stick," "grade rod," and "measuring stick" are used interchangeably for the purposes of the present disclosure.

Embodiments of the present disclosure are directed to a smart elevation rod assembly, or sensor rod assembly, for detecting a laser beam from a corresponding laser level and automatically calculating instructions for a user. Such instructions may include required adjustments necessary to reach a target elevation, the amount a user must remove or add to the surface to reach the target elevation (i.e., the cut or fill amount), or instructions for forming graded or sloped surface.

Figure 1A:
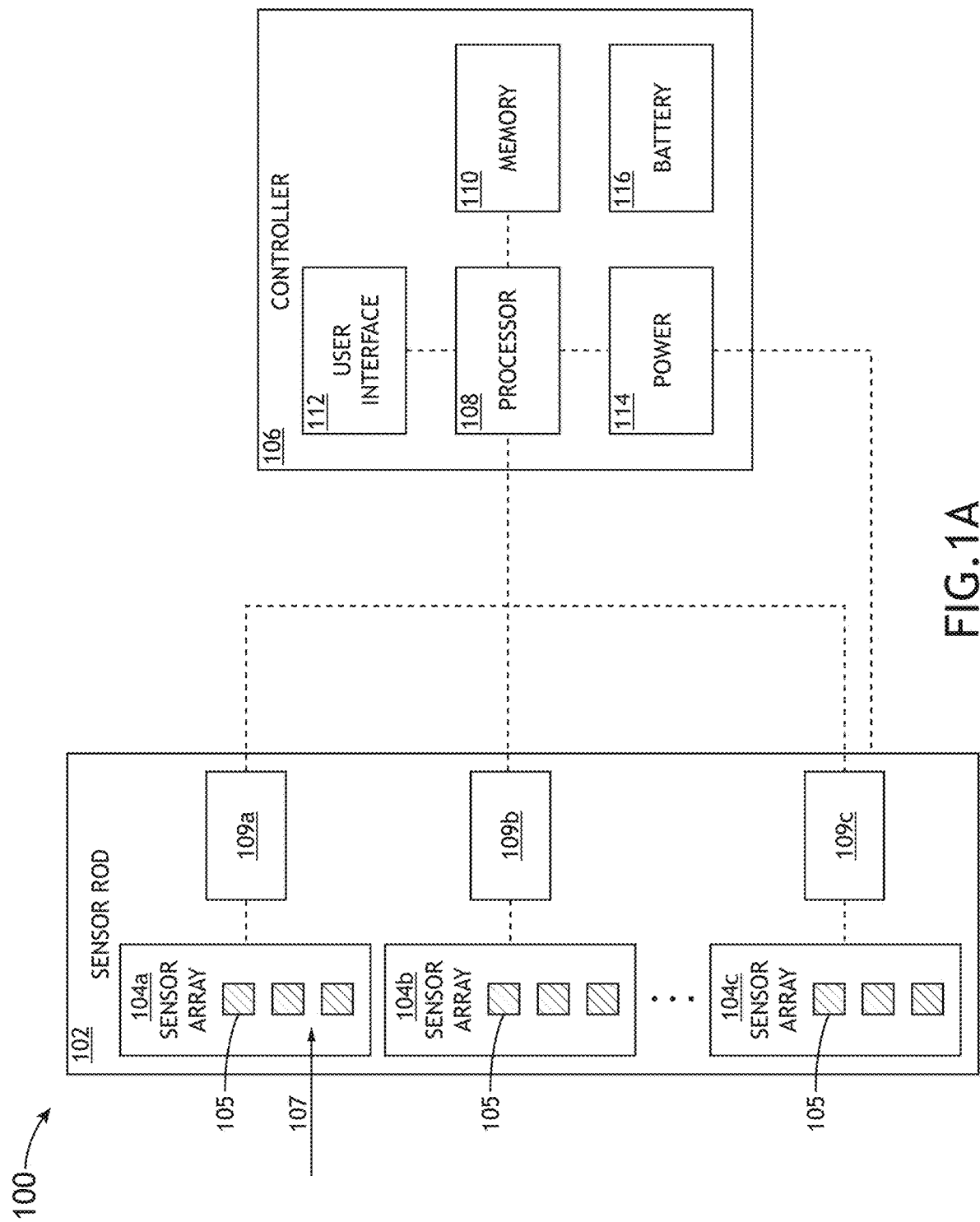
FIGS. 1A-6 illustrate the various embodiments of a sensor rod assembly and a method of measuring and calculating elevations, in accordance with one or more embodiments of the present disclosure.

FIG. 1A illustrates a simplified block diagram view of the sensor rod assembly 100 of the present disclosure, in accordance with one or more embodiments of the present disclosure.

In one embodiment, the sensor rod assembly 100 includes a rod 102. The rod 102 may include any rod structure capable of securing the various components described throughout the present disclosure. In one embodiment, the sensor rod assembly 102 includes a set of sensor arrays 104a-104c. One or more of the sensor arrays 104a-104c may include a set of sensor devices 105 suitable for detecting laser light (e.g., one or more photodiodes). In one embodiment, the sensor devices 105 are disposed on the rod structure 102.

In another embodiment, the sensor rod assembly 100 includes detection circuitry 109a-109c communicatively coupled to the sensor devices 105. In another embodiment, as shown in FIG. 1A, the detection circuitry 109 may be distributed across the different sensor arrays 104 of the sensor rod assembly 102. It is noted that for purposes of simplicity FIG. 1A only depicts connection lines between the detection circuitry portions 109a-109c and the sensor arrays 104a-104c. As will be discussed in additional detail further herein, such a configuration is a not a limitation on the scope of the present disclosure and it is contemplated herein that each sensor device 105 may have a corresponding detection circuit.

In another embodiment, the sensor rod assembly 100 includes a controller 106. In one embodiment, the controller 106 includes one or more processors 108. The one or more processors 108 may be communicatively coupled to memory 110. In another embodiment, the one or more processors 108 are configured to execute a set of program instructions stored in memory 108 configured to perform one or more of the various steps described throughout the present disclosure.

In another embodiment, the one or more processors 108 are communicatively coupled to the detection circuitry 109a-109c such that the one or more processors 108 receive one or more detection signals from the sensor devices 105 of the various sensor arrays 104a-104c via the detection circuitry 109a-109c. In another embodiment, the one or more processors 108 are configured to determine a position of a laser beam 107 incident on the sensor rod device based on the received one or more detection signals from the detection circuitry.

In another embodiment, the one or more processors 108 receive a benchmark elevation value input from the user interface 112. In another embodiment, the one or more processors 108 receive, from the detection circuitry 109a-109c, one or more detection signals generated by an incident laser beam 107 when the sensor rod assembly 100 is positioned at the benchmark elevation. In another embodiment, the one or more processors 108 receive a benchmark elevation calibration indication from the user interface 112. In another embodiment, the one or more processors 108 store a parameter indicative of at least one of the height or elevation of the laser beam measured during the benchmark elevation calibration. In another embodiment, the one or more processors 108 receive a target elevation value input from the user interface 112. In another embodiment, the one or more processors 108 calculate a target laser height based on the stored parameter indicative of at least one of the height or elevation of the laser beam during the benchmark elevation calibration and the inputted target elevation value. In another embodiment, the one or more processors 108 display, on the user interface, one or more indicators for rod height adjustment of the sensor rod 102 to achieve the target elevation. In one embodiment, the user interface 112 may display a numerical value for which a user must adjust the height of the rod 102 to achieve the target elevation. In another embodiment, the user interface 112 may display a graphical indicator (e.g., up/down arrow) measured from the current laser height for which a user must adjust the height of the rod 102 to achieve the target elevation. In another embodiment, the user interface 112 may display a cut/fill amount (i.e., the difference between the current elevation and the target elevation) to indicate to the user how much ground or surface must be cut (i.e., removed) or filled (i.e., added) to achieve the target elevation.

In another embodiment, the controller 106 includes power management circuitry 114. The power management circuitry 114 may be controlled by the one or more processors 114 to control the level of electrical power delivered to one or more components of the sensor rod assembly 100. The power management circuitry 114 may be used to control electrical power delivery to the sensor arrays 104, the detection circuitry 109 and any other components that may require power management.

In another embodiment, the controller 106 includes contains a power source used to power the various components of the sensor rod assembly 100. For example, as shown in FIG. 1A, the power source may include, but is not limited to, one or more batteries 116. For instance, the batteries 116 may include, but are not limited to, one or more disposable or rechargeable batteries. Additionally, the power source may include one or more mechanisms for charging the one or more batteries 116. For example, the power source may include, but is not limited to, one or more electrical charging ports (e.g., AC port) or photovoltaic panels for charging the one or more batteries 116.

In one embodiment, the controller 106 includes a user interface 112. The user interface 112 may include a display device and/or a user input device (not shown) for displaying measurement results or processing results to a user and/or receiving instructions from the user.

In one embodiment, as shown in FIG. 1A, the user interface 112 is embodied in the controller 106. In one embodiment, the controller 106 may be mechanically coupled to the sensor rod 102 in an integrated sensor rod/controller device. In another embodiment, the controller 106 may be separated from the sensor rod 102, whereby the user interface 112 is embodied in a dedicated controller 106. In another embodiment, the controller 106 may be reversibly attachable to the sensor rod 102 (e.g., attachable one or more clips, fasteners, adhesives, snaps, slots, hook/loop connectors, magnets and etc.), whereby the user interface 112 is embodied in a dedicated controller 106.

Figure 1B:
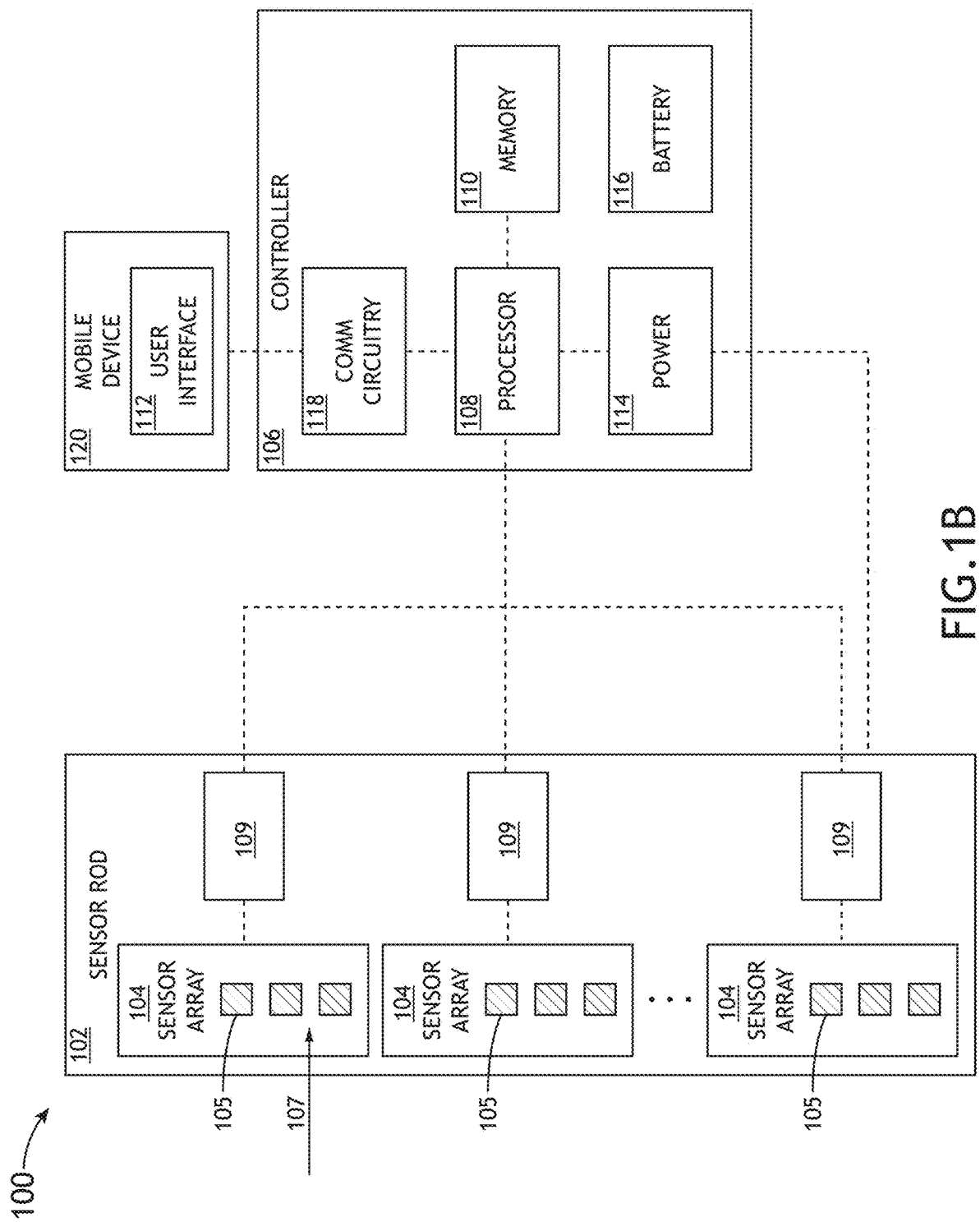

In one embodiment, as shown in FIG. 1B, the user interface 112 is embodied in a mobile device 120. In this embodiment, the one or more processors 108 of the controller 106 are communicatively coupled to the mobile device 120 via communication circuitry 118. The user may receive and/or input information through the user interface (e.g., touchscreen, buttons, etc.) of the mobile device 120 (e.g., smartphone, tablet, personal digital assistant (PDA), etc.). In this regard, the mobile device may be paired to the controller 106 associated with a given sensor rod 102. The communicative coupling between the controller 106 and the mobile device 120 may be established via the communication circuitry 118 by any wireless and/or wireline means known in the art. For purposes of simplicity corresponding communication circuitry has not been depicted within mobile device 120. It is noted herein and should be recognized by those skilled in the art that the mobile device 120 may include communication circuitry for interfacing with the communication circuitry 118 of the controller 106 and allowing a wireless pairing between the controller 106 and the mobile device 120.

The communication circuitry 118 of the controller 106 and the communication circuitry of the mobile device 120 may include circuitry suitable for establishing a local or short-range wireless connection between the controller 106 and the mobile device 120. In this embodiment, the communication circuitry 118 may include circuitry for establishing a radio-frequency link (e.g., BLUE TOOTH, LOW ENERGY BLUE TOOTH, near field communication (NFC) and etc.) between the controller 106 and the mobile device 120.

Figure 1C:
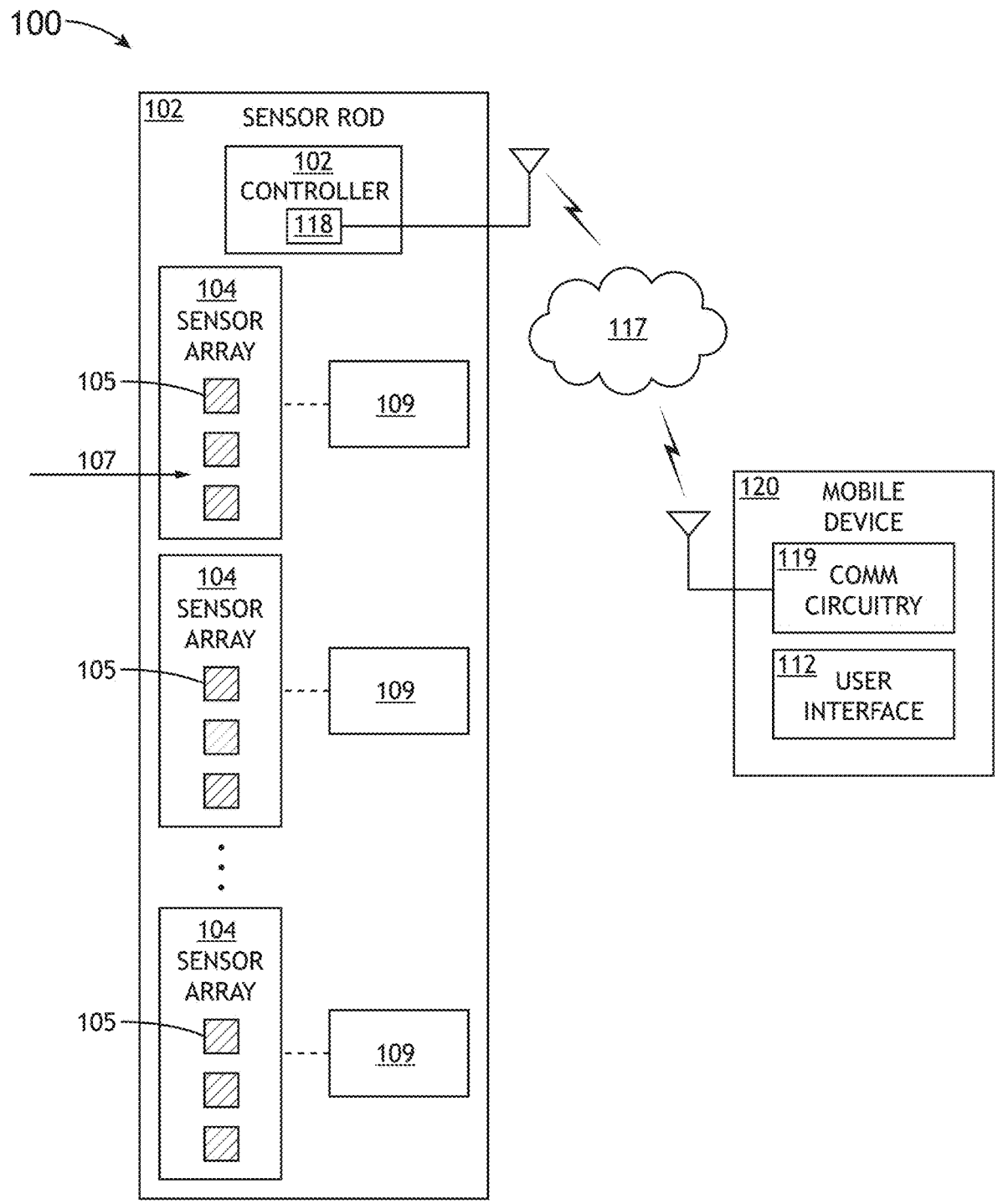

In another embodiment, as shown in FIG. 1C, the communication circuitry 118 of the controller 106 may include one or more network interface devices for interfacing with network 117 (i.e., the cloud). In addition, the mobile device 120 may include communication circuitry 119 which may include one or more network interface devices also suitable for interfacing with network 117. The network interface devices may include any network interface devices known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, LTE, Wi-Fi protocols, and the like. It is further noted that that the general architecture of FIG. 1C, whereby the controller 106 is disposed on or housed within the rod 102 may be extended to any of the various embodiments of the present disclosure.

The one or more processors 108 of controller 106 may include any one or more processing elements known in the art. In this sense, the one or more processors 108 may include any microprocessor device configured to execute algorithms and/or instructions. In one embodiment, the one or more processors 108 may be embodied as computer, mainframe computer system, workstation, image computer, parallel processor, handheld computer (e.g. tablet, smartphone, or phablet), or other computer system (e.g., networked computer) configured to execute a program configured to operate the assembly 100, as described throughout the present disclosure. It should be recognized that the steps described throughout the present disclosure may be carried out by a single computer system or, alternatively, multiple computer systems. In general, the term "processor" may be broadly defined to encompass any device having one or more processing r logic elements, which execute program instruction from a memory 110 (i.e., non-transitory memory medium). Moreover, different subsystems of the sensor rod assembly 100 (e.g., sensor rod 102, user interface 112, or mobile device 120) may include processor or logic elements suitable for carrying out at least a portion of the steps described throughout the present disclosure. Therefore, the above description should not be interpreted as a limitation on the scope of the present disclosure but merely an illustration.

The memory 110 may include any storage medium known in the art suitable for storing program instructions executable by the associated one or more processors 108 and/or results from the detection circuitry 109 and/or one or more processors 108. For example, the memory 110 may include a non-transitory memory medium. For instance, the memory 110 may include, but is not limited to, a read-only memory, a random access memory, a magnetic or optical memory device (e.g., disk), a solid state drive and the like. In another embodiment, the memory 110 is configured to provide display information to a display device of the user interface 112 and/or the output of the various steps described herein. It is further noted that memory 110 may be housed in a common controller housing with the one or more processors 108. In an alternative embodiment, the memory 110 may be located remotely with respect to the physical location of the processors 108 and controller 106. For example, the one or more processors 108 of controller 106 may access a remote memory (e.g., server), accessible through a network (e.g., internet, intranet and the like).

The user interface device 112 may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to a CRT display. In another embodiment, the display device may include a set of lighted or lightable buttons. Those skilled in the art should recognize that a variety of display devices may be suitable for implementation in the embodiments of the present disclosure and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present disclosure.

The user input device of the user interface 112 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a button, a bezel input device or the like. In the case of a touchscreen interface, those skilled in the art should recognize that a large number of touchscreen interfaces may be suitable for implementation in the embodiments of present disclosure. For example, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the embodiments of the present disclosure. In another embodiment, the user input device may include, but is not limited to, a set of buttons disposed on a surface of the controller 106 or mobile device 120.

Figure 1F:
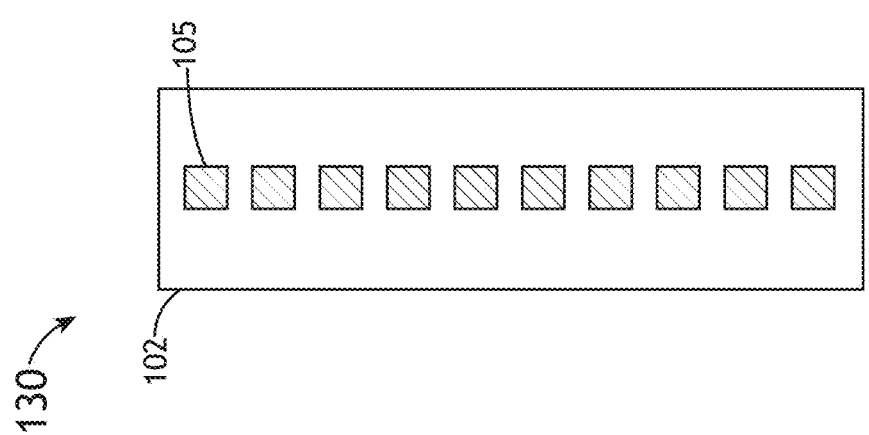
Figure 1E:
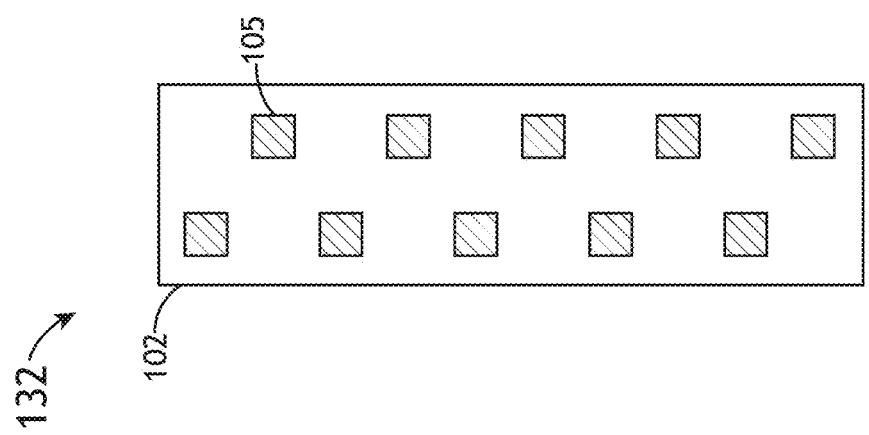
Figure 1D:
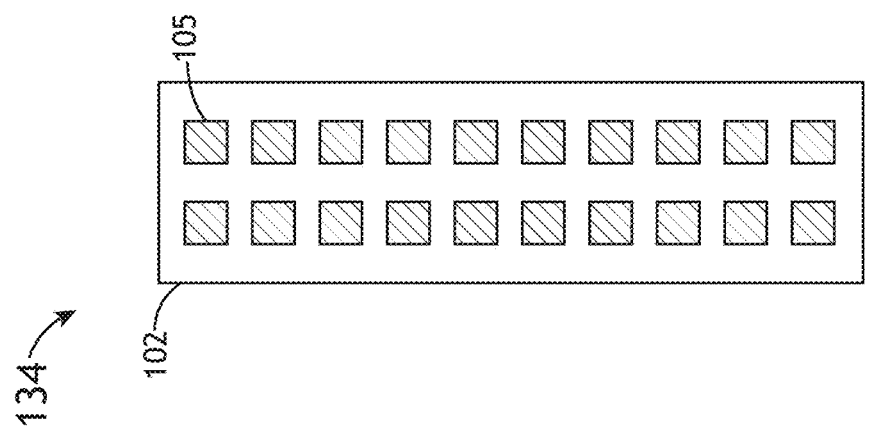

FIGS. 1D-1F illustrate various layout patterns of the sensor devices 105 of the sensor rod assembly 102, in accordance with one or more embodiments of the present disclosure. In one embodiment, as shown in FIG. 1D, the sensor devices 105 may be disposed on the rod structure 102 in a linear pattern. In this regard, the sensor devices 105 may generally be arranged in a column that runs the length of the rod structure 102. In another embodiment, as shown in FIG. 1E, the sensor devices 105 may be disposed on the rod structure 102 in a staggered pattern. In this regard, the sensor devices 105 may generally be arranged in an alternating staggered pattern that runs the length of the rod structure 102. In another embodiment, as shown in FIG. 1F, the sensor devices 105 may be disposed on the rod structure 102 in a staggered pattern. In this regard, the sensor devices 105 may generally be arranged in a set of rows that run the length of the rod structure 102. It is noted herein that the various depictions in FIGS. 1D-1F are not limitations on the scope of the present disclosure and are provided merely for illustrative purposes. It is contemplated that the sensor devices 105 of system 100 may be arranged in any number of equivalent patterns and/or layouts.

Figure 2A:
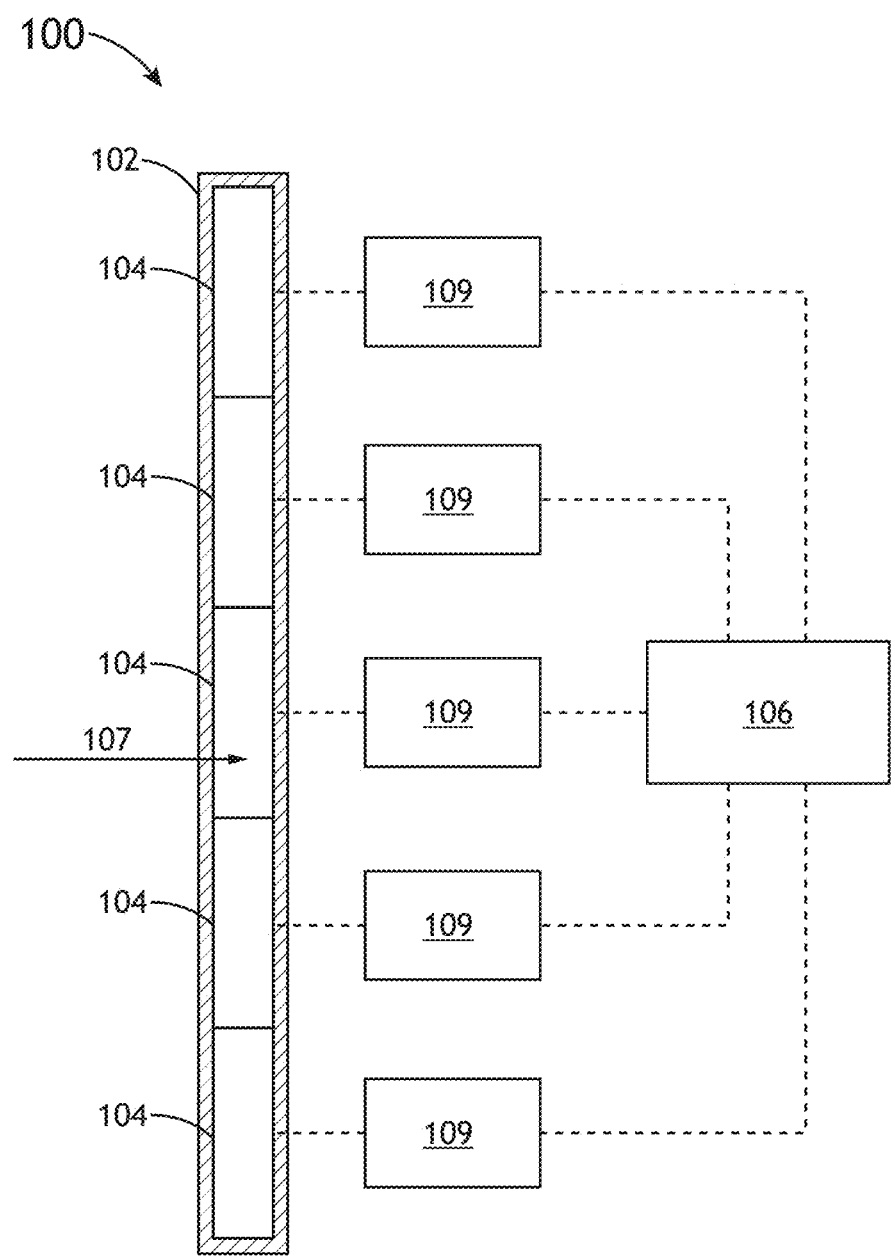

FIG. 2A-2D illustrate simplified schematic views of the sensor rod assembly 100, in accordance with one or more embodiments of the present disclosure. In one embodiment, as shown in FIG. 2A, the sensor arrays 104, or sensor segments, may be distributed along the length of the rod 102. It is noted that for purposes of simplicity the detection circuitry 109 has been shown pictorially outside of the rod 102. This depiction is not a limitation on the scope of the present disclosure is provided mere for purposes of simplicity. It is recognized herein that in certain embodiments the detection circuitry 109 is disposed onboard the rod structure 102.

Figure 2B:
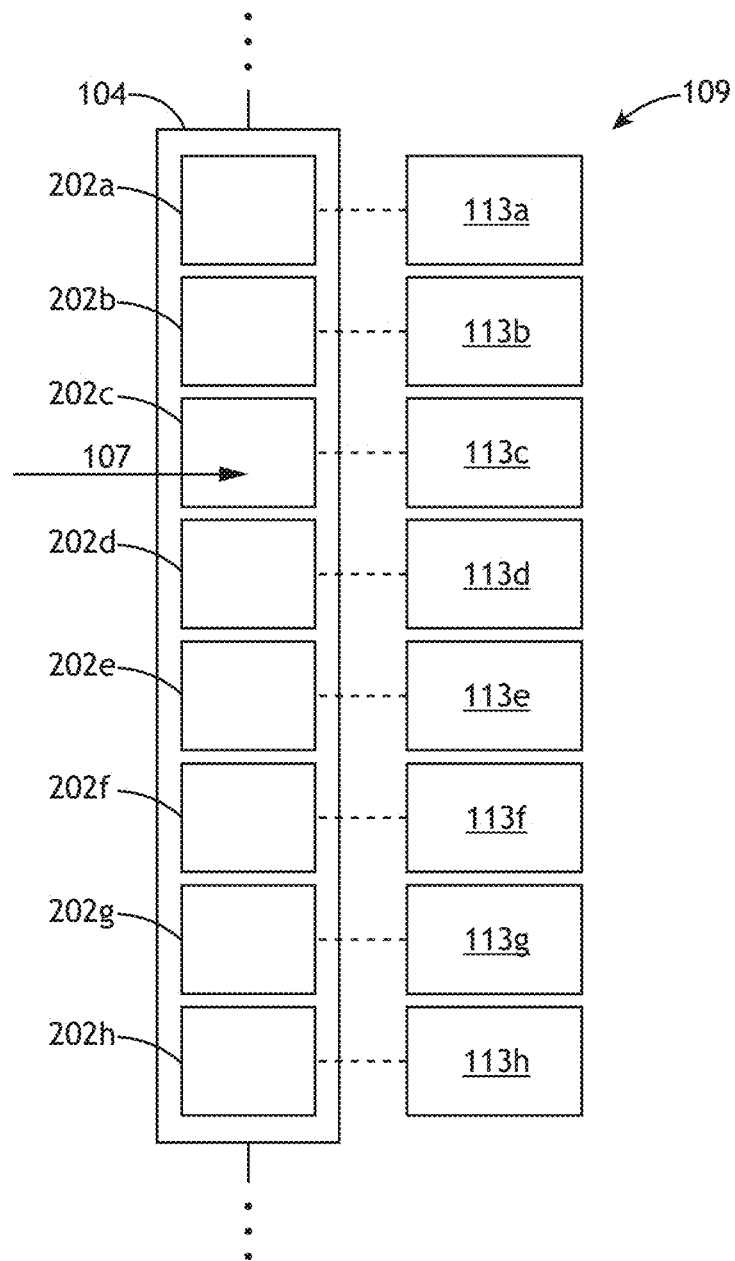

In another embodiment, as shown in FIG. 2B, one or more of the sensor arrays 104 includes a set of sensor units 202a-202h. In another embodiment, the detection circuitry 109 includes a set of detection units 113a-113h for registering one or more detection signals from the sensor units 202a-202h.

Figure 2C:
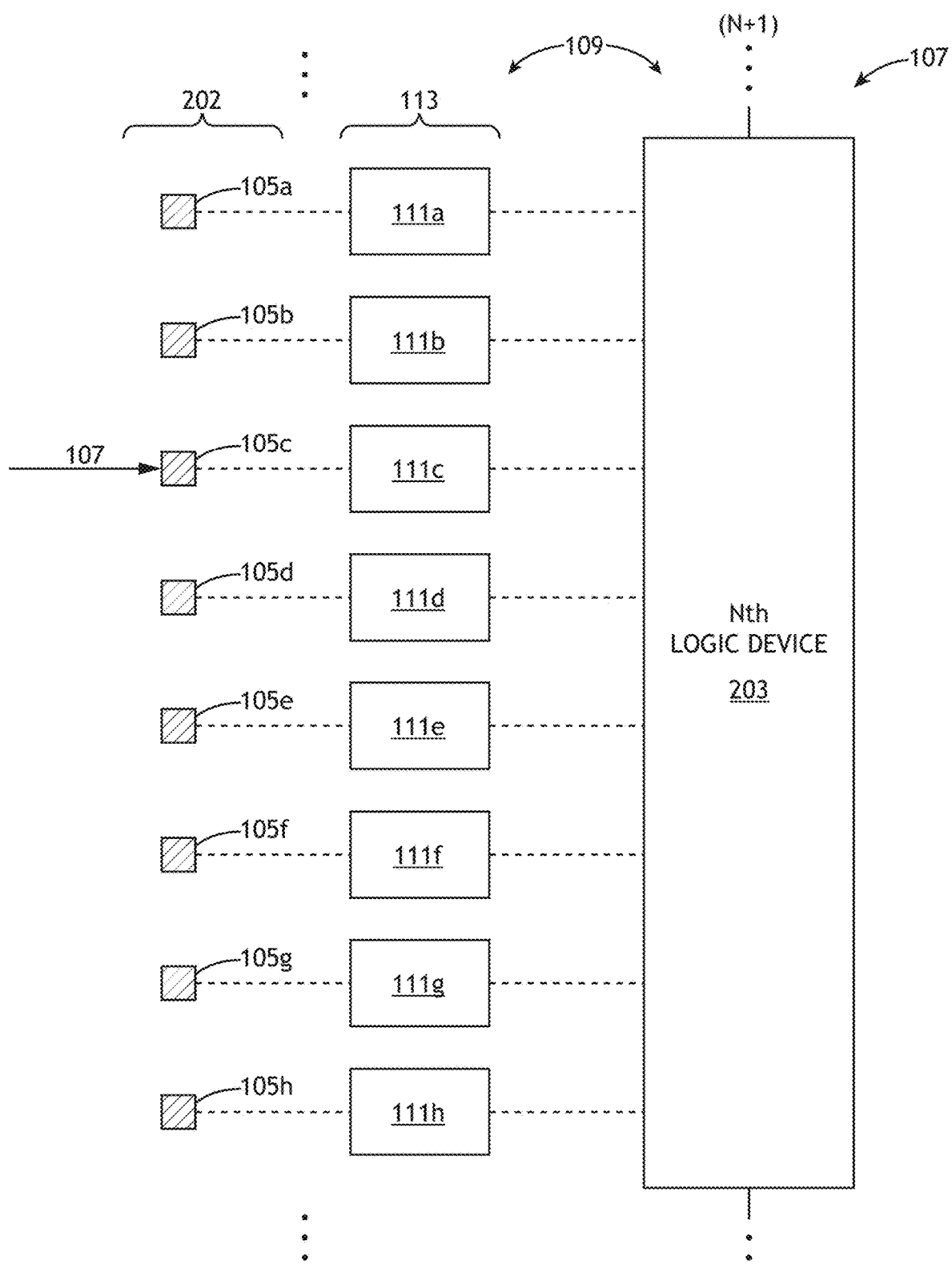

In another embodiment, as shown in FIG. 2C, each detection unit 113 includes a set of detection circuits 111a-111h. In this regard, each of the detection circuits 111a-111h may be coupled to the output of a corresponding sensor device 105a-105h, as shown in FIG. 2C. Collectively, the individual detection circuits 111a-111h of a particular detection unit 113 associated with a particular sensor unit 202 serves to detect a laser beam detection event at one or more of the sensor devices 105a-105h. The detection unit 113 serves to identify which detection circuit 111a-111h logs the one or more detection events. In another embodiment, the output of the detection circuits 111a-111h may be coupled to one or more logical devices 203. The one or more logical devices 203 may include, but are not limited to, a complex programmable logic device (CPLD), field-programmable gate array (FPGA), an application-specific integrated circuit (ASIC), a micro-controller, a shift register and the like.

Figure 2D:
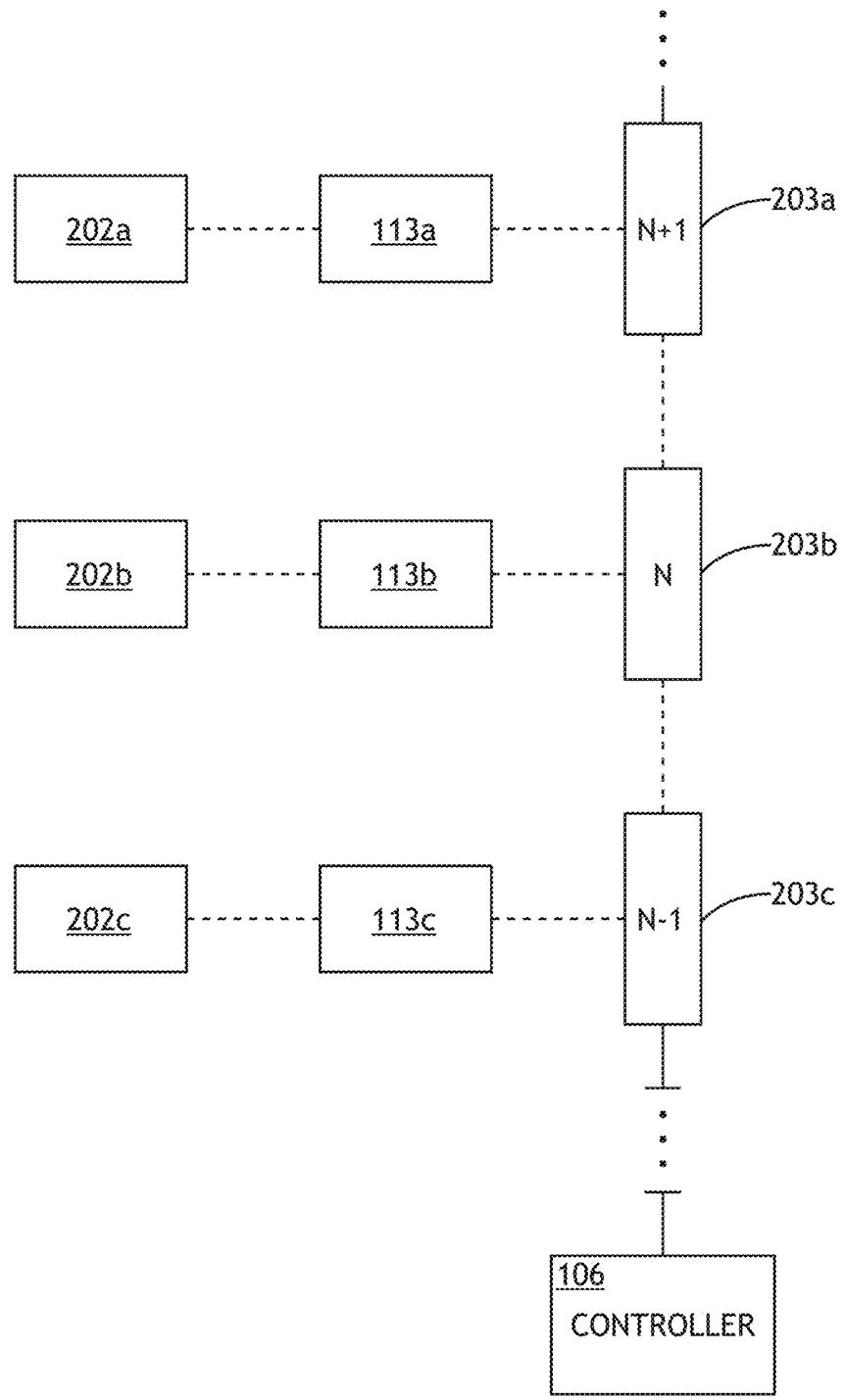

In another embodiment, a logic device 203 associated with a particular sensor unit 202 may be coupled to adjacent logic devices. In this regard, the set of logic devices 203 form a series of registers for detecting/registering detection signals from the sensor devices 105. For example, as shown in FIGS. 2C and 2D, an Nth logic device (receiving detection signals from an Nth set of detection circuits 111a-111h) may be coupled to an N+1 logic device (receiving detection signals from an N+1 set of detection circuits 111a-111h) and an N-1 logic device (receive detection signals from an N-1 set of detection circuits 111a-111h).

In another embodiment, the set of logic devices 203 (i.e., N-1 logic device, Nth logic device, N+1 logic device) are coupled to the one or more processors 108 of the controller 106. In this regard, the one or more processors 108 of controller 106 may receive serialized data from the set of logic devices 203, whereby each logic device includes a set of bits (e.g., 8 bits corresponding to the 8 detection circuits). In another embodiment, one or more clock functions of the one or more processor 108 may cause the one or more processors 108 to read out a bit at the end of the logic device series, which, in turn, causes all of the other registered bits in the logic device series to shift by one. This process may be repeated until all bits are read out from the series of logic devices.

Based on the identification of the one or more sensor devices 105 within the various sensor units 202 registering a detection event, the one or more processors 108 may then determine the physical location of the impinging laser beam based on a database stored in memory 110 (or any other memory location) that correlates a sensor device identification number/string with the position on the rod structure 102.

Figure 2E:
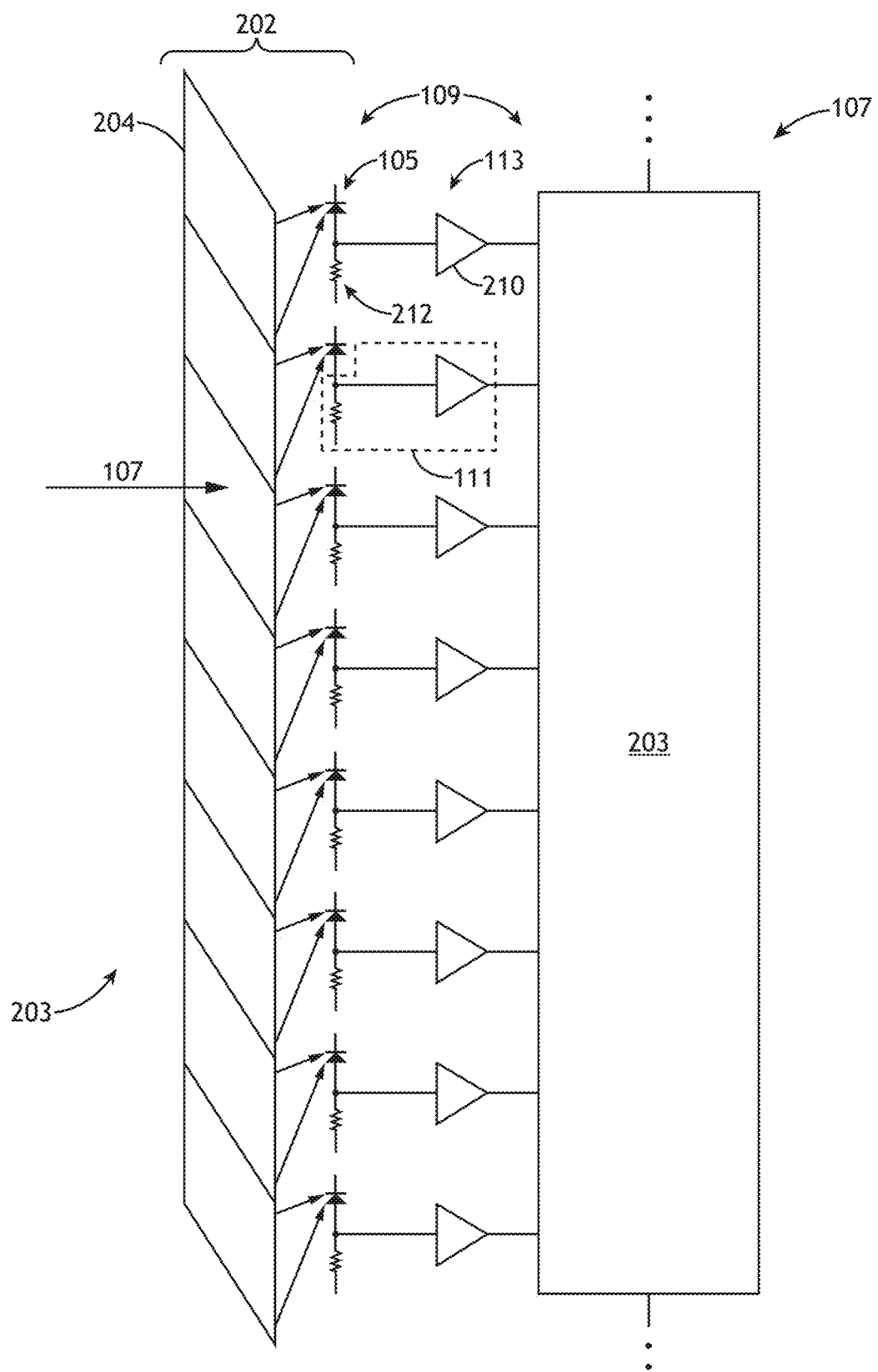

FIG. 2E illustrates a simplified schematic view of a sensor unit 202 and corresponding detection unit 113 of the sensor rod assembly 100, in accordance with one or more embodiments of the present disclosure. In one embodiment, one or more of the detection circuits 111 of the detection unit 113 include a comparator 210 and one or more resistors 212. In one embodiment, a detection signal can be identified utilizing a threshold. For example, the threshold may be related to an average response (e.g., intensity) from all sensor devices 105. For instance, the threshold may be defined as the average response of all (or a portion of the sensor devices 105) plus some amplification offset or factor. Then, using the comparator 210 to compare a particular signal voltage (defined by the resistance 212) to the defined threshold value the detection unit 113 may either reject the signal or pass the signal to the logic element 203. In cases where the signal is below the threshold value the detection unit 113 may reject the signal. In cases where the signal is above the threshold value the detection unit 113 may pass the signal to the logic device 203 where it is registered. The utilization of a rejection protocol aids in reducing the likelihood of false positives that may occur due other light sources (e.g., flood lighting, strobe lighting, etc.).

It is noted that the logic device 203 (e.g., FPGA, ASIC, CPLD) may incorporate a set of latches and shift registers to indicate which sensor device 105 of the given sensor unit 202 was struck with the laser beam 107. It is noted that a particular sensor unit 202 may include any number of sensor devices 105 and corresponding detection circuits. In one embodiment, in the case of an 8-bit logic device, the sensor unit 202 may include 8 sensor devices 105 and 8 corresponding detection circuits 111.

It is noted that additional signal detection approaches are discussed in more detail further herein.

Figure 2F:
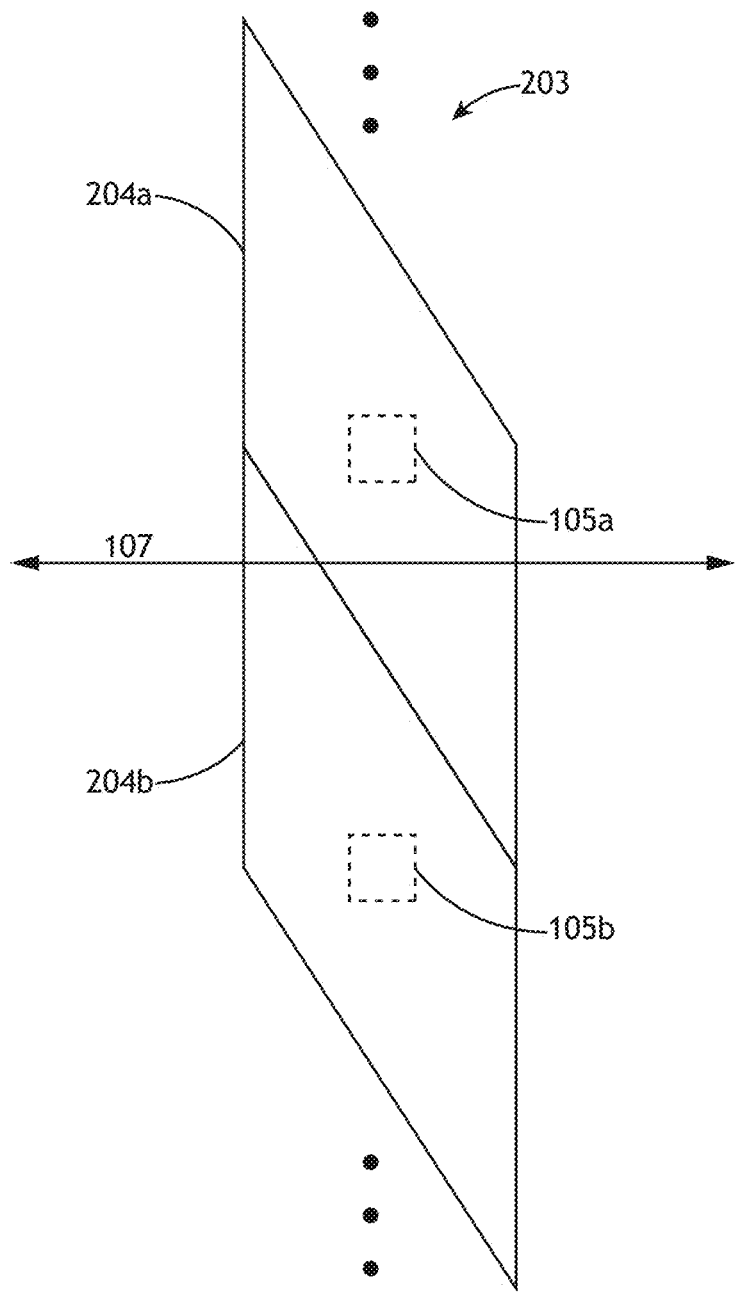
Figure 2G:
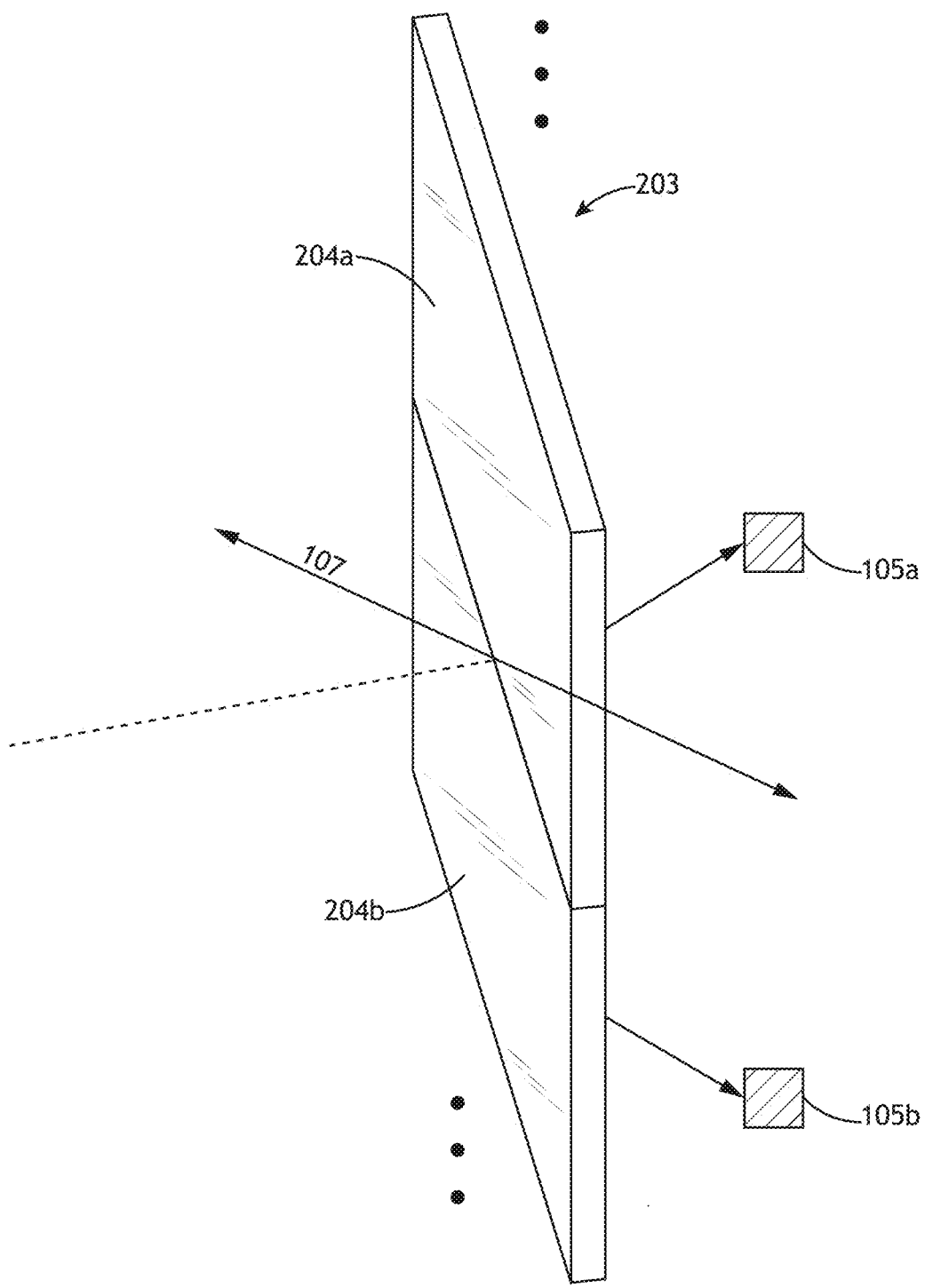

In another embodiment, as depicted in FIGS. 2E-2G, one or more sensor units 202 may include a set of optical devices for directing light onto one or more of the sensor devices 105 of a particular sensor unit 202.

In one embodiment, the set of optical devices include a set of lenses. For example, as shown in FIGS. 2E-2G, a given sensor unit 202 may include a lens array 203 for focusing laser light from the laser beam 107 onto the sensor devices 105 (e.g., photodiodes). In one embodiment, the lens array 203 includes a set of linearly arranged lenses, where each lens corresponds to a sensor device 105.

It is noted that the lenses 204 of the lens array 203 may take on any geometrical shape. For example, as shown in FIGS. 2E-2G, the lenses may be cut to a rhombus shape such that they can be fitted together to formed a tiled surface, while each lens maintains its focusing power along the optical axis towards the corresponding sensor device 105. It is noted herein that FIG. 2E is provided for conceptual purposes.

In one embodiment, as shown in FIGS. 2F and 2G, as the laser beam 107 is swept across the surface of the tiled lens array 203 it will cross the dividing line between a first lens 204a and a second lens 204b. In this embodiment, based on the vertical position of the swept laser beam (appearing as a line due to the sweeping from the laser level), the lenses 204a, 204b will focus different amounts of light onto the sensor devices 105a, 105b. As such, the sensor devices 105a, 105b will produce different results (e.g., time of signal, intensity, etc.) depending on the vertical position of the laser beam 107. In one embodiment, the one or more processors 108 may determine an estimated position between the first sensor device 105a and the second sensor device 105b based on the detection characteristics of the two device 105a, 105b. For example, if the laser beam 107 is closer to device 105a light will be focused (via lens 204a) onto device 105a for a longer period of time than device 105b (via lens 204b) because the beam spends more time on lens 204a (as shown in FIG. 2F).

In one embodiment, the logic device 203 includes a first counter configured to measure the duration of the incident laser beam 107 (after being focused through the first lens 204a) on a first sensor device 105a of the sensor unit 202. In another embodiment, the logic device 203 includes a second counter configured to measure a duration of the incident laser beam 107 (after being focused through the second lens 204b) on a second sensor device 105b adjacent to the first sensor unit 105a.

In another embodiment, the timing data is transmitted to the one or more processors 108 and the one or more processors 108 perform an interpolation routine on the timing data. For example, the one or more processors 108 perform an interpolation routine between the duration measurement of the first counter and the duration measurement of the second counter to determine an estimated position of the incident laser beam 107 between the first sensor device 105a and the second device 105b.

In another embodiment, the interpolation may be carried out by measuring intensity at the first and second devices 105a, 105b. For example, the detection circuitry and/or the one or more processors 108 may determine the average intensity or the maximum intensity (or some other measurement of intensity) at each device 105a, 105b over a selected amount of time. Based on the relative intensity measurements, the one or more processors 108 may carry out an interpolation routine to determine an estimated position of the incident laser beam 107 between the first sensor device 105a and the second device 105b.

It is noted that while rhombus lenses are described above and depicted in FIGS. 2E-2G this configuration should not be interpreted as a limitation on the scope of the present disclosure. It is contemplated herein that the lenses 204 may take on any number of geometrical shapes that allow for tiling of the lenses. For example, the lenses may include, but are not limited to, triangular lenses, rectangular lenses, square lenses, hexagonal lenses, trapezoidal lenses, and the like.

It is further noted that the set of optical elements used to estimate laser beam position between a pair of devices 105a, 105b is not limited to lenses. For example, any number of optical devices, such as, but not limited to, gratings, prisms, mirrors, optical guides, optical fibers and the like may be used to provide an interpolation framework similar to that described above.

In another embodiment, one or more sensor units 202 may include one or more filters configured to filter illumination incident on the lens array 203 and/or devices 105. For example, the one or more filters may include a set of bandpass filters tuned to the wavelength of the laser beam 107. Such a filtration configuration may reduce the likelihood of false positives being registered by the one or more sensor devices 105.

It is noted that the sensor rod assembly 100 may be constructed to have any sensor device density. For example, the lineal density of sensor devices 105 along the sensor rod 102 may be between, but is not limited to, 5 and 500 devices/lineal foot. In one embodiment, the sensor device density may be between 50 and 100 sensor devices per lineal foot. In one embodiment, such as an embodiment equipped with the lens array 203, the sensor device density may be between 10 and 15 sensor devices per lineal foot.

Figure 2H:
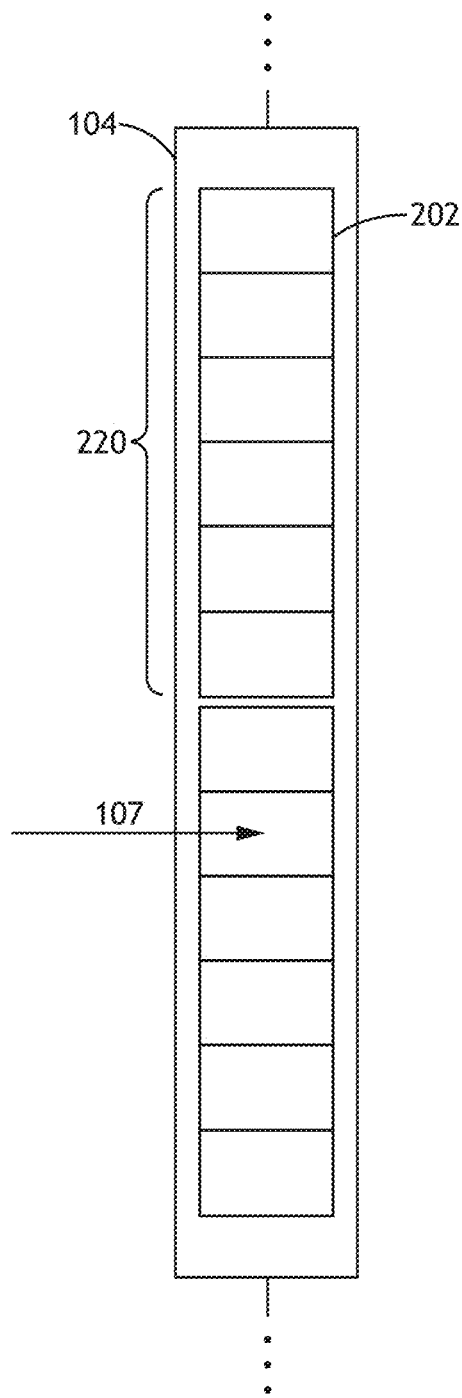
Figure 2I:
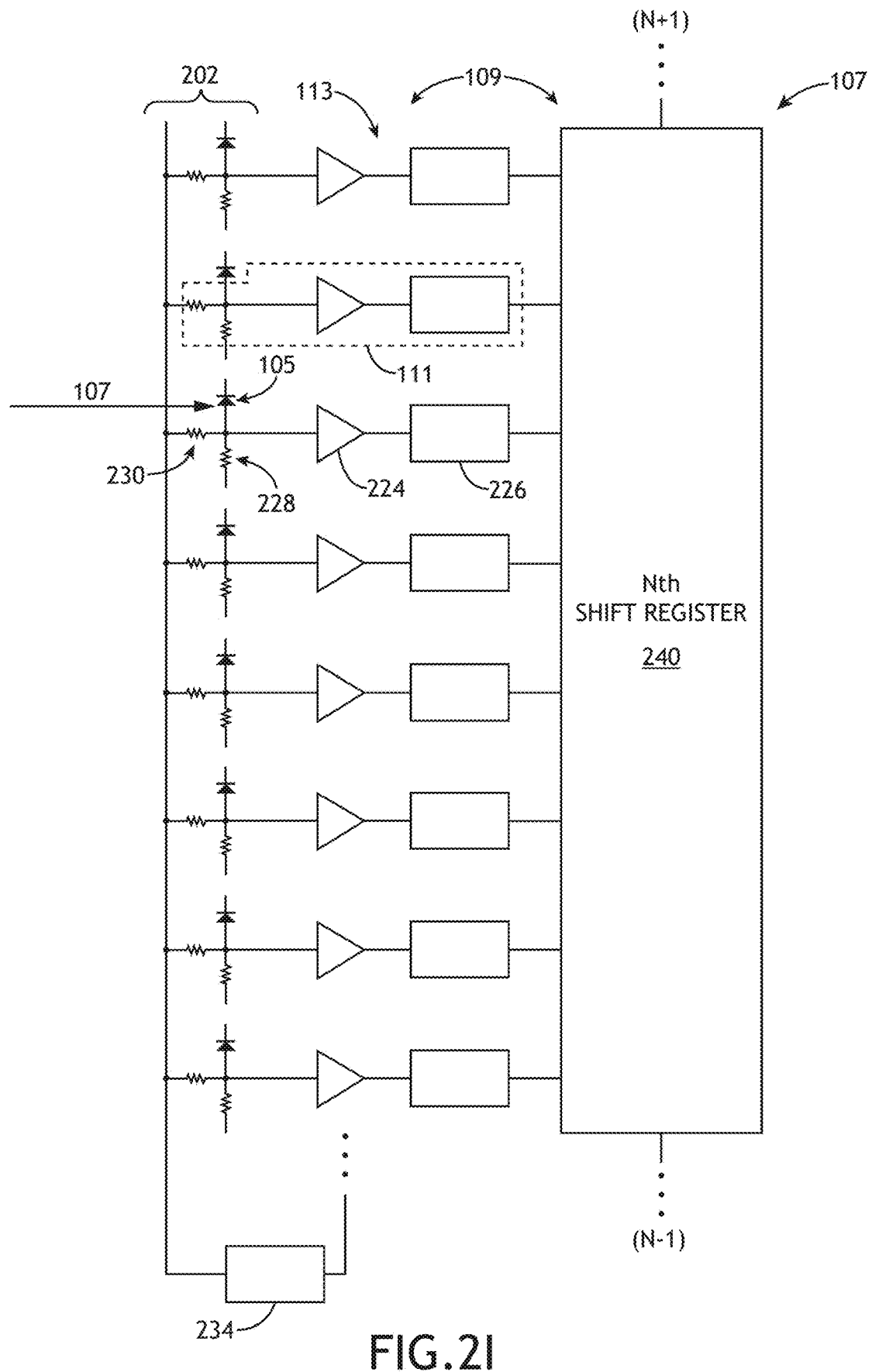

FIG. 2H-2I illustrate simplified schematic views of a particular sensor array 104, a sensor unit 202 and a corresponding detection unit 113 of the sensor rod assembly 100, in accordance with one or more embodiments of the present disclosure 100. It is noted that the various embodiments and components described in the context of FIGS. 1A-2G should be interpreted to extend to the embodiments of FIGS. 2H-2I (and vice-versa) unless otherwise noted.

In one embodiment, as shown in FIG. 2H, the sensor arrays 104, or sensor segments, may include two or more sensor banks 220. In another embodiment, the sensor banks 220 include a set of sensor units 202. The sensor arrays 104 are distributed along the length of the rod 102. It is noted that the utilization of sensor banks 220 is not a limitation on the scope of the present disclosure and is provided merely for purposes of illustration. For example, the embodiments of FIGS. 2H and 2I may be implemented without delineated sensor banks 220.

In one embodiment, as shown in FIG. 2I, the detection circuitry 109 includes a set of detection circuits 111 and a shift register 240. In one embodiment, one or more of the detection circuits 111 include a comparator 224, a latch 226, a first resistor 228 and/or a second resistor 230. It is noted that resistor 230 is used for ambient or strobe light rejection. In one embodiment, a logic/processor element 234 may receive a detector response from all or a portion of the sensor devices 105. Then, the logic/processor element 234 may average the response over the detectors to define a threshold value. The threshold value may then be fed to the comparators 224 of each detection circuit 111. Then, each comparator 224 may compare the measured voltage output (defined by resistor 228) received from the corresponding sensor device 105 (e.g., photodiode) to the threshold value. In cases where the voltage signal from a sensor device 105 is less than the threshold value the signal is rejected. In cases where the voltage signal from a sensor device 105 is greater than the threshold value the signal is passed to the corresponding latch 226.

In another embodiment, a shift register 240 associated with a particular sensor unit 202 may be coupled to adjacent shift registers. In this regard, the set of shift registers 240 form a series of registers for detecting/registering detection signals from the sensor devices 105. For example, an Nth shift register (receiving detection signals from an Nth set of latches) may be coupled to an N+1 shift register (receiving detection signals from an N+1 set of latches) and an N−1 shift register (receiving detection signals from an N−1 set of latches).

In another embodiment, the set of shift registers (i.e., N−1 shift register, Nth shift register, N+1 shift register) are coupled to the one or more processors 108 of the controller 106. In this regard, the one or more processors 108 of controller 106 may receive serialized data from the set of shift registers. In another embodiment, one or more clock functions of the one or more processor 108 may cause the one or more processors 108 to read out a bit at the end of the shift register series, which, in turn, causes all of the other registered bits in the shift register series to shift by one. This process may be repeated until all bits are read out from the series of shift registers.

In this embodiment, the latches 226 may register a detection signal until it is passed to the shift register 240. It is noted that each latch corresponds to one bit. The latch may store the registration until cleared out. In one embodiment, all latches may be cleared out and then checked periodically for detected events.

In another embodiment, the power management circuitry 114 is configured to provide power control to the sensor devices 105 on a per-bank 220. In another embodiment, the power management circuitry is configured to maintain power to the shift registers 240.

In another embodiment, the sensor rod assembly 100 may include one or more global positioning receivers configured to receive global position information from a global position system (e.g., GPS, GNSS, GLONASS and the like). For example, a GPS receiver (not shown) may be included in or near the controller 106. Such a GPS receiver may be able to automatically record the position of sensor rod 102. For example, the GPS receiver and an associated user interface may be used to record one or more positions used in automated calculation such as slope calculations discussed in additional detail further herein.

Figure 3A:
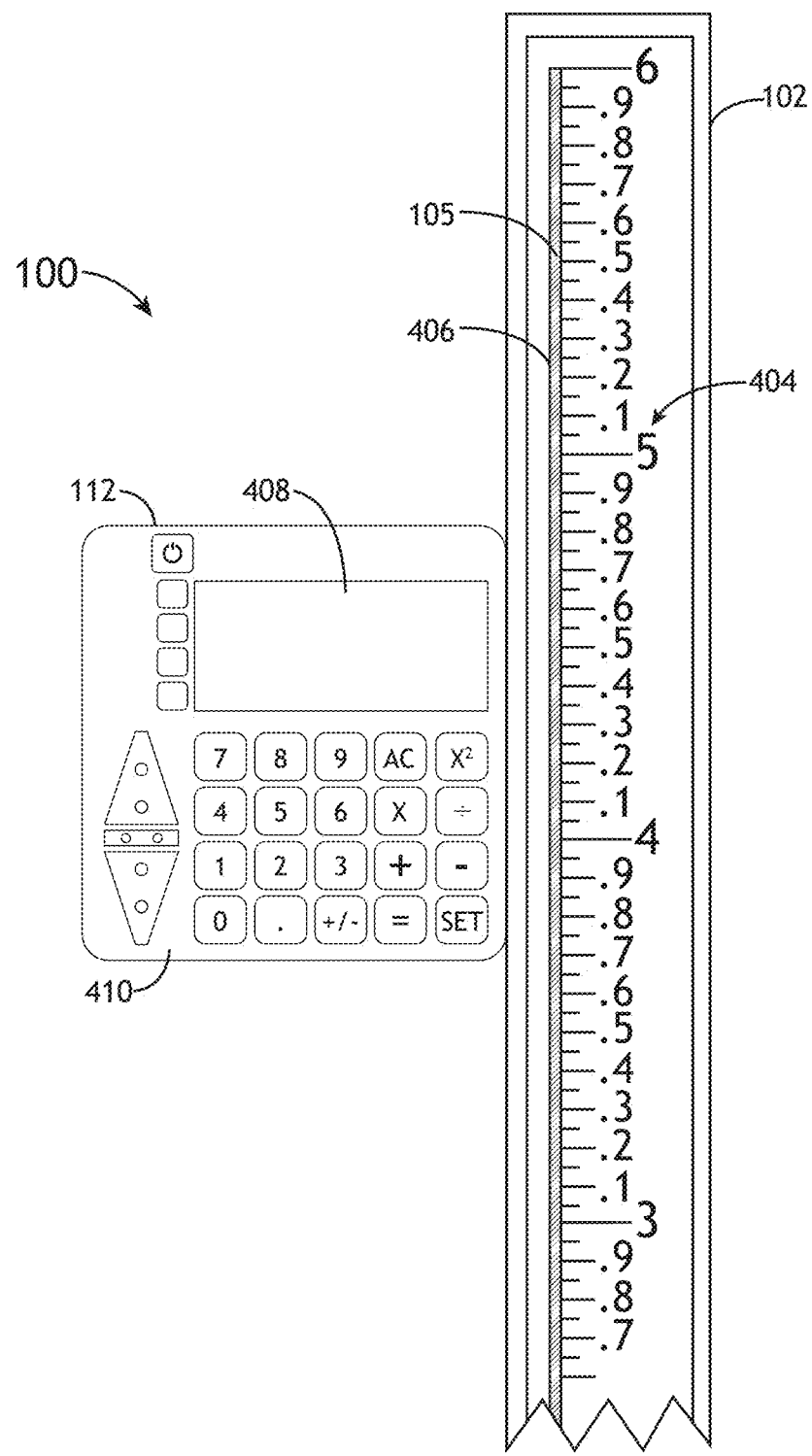
Figure 3B:
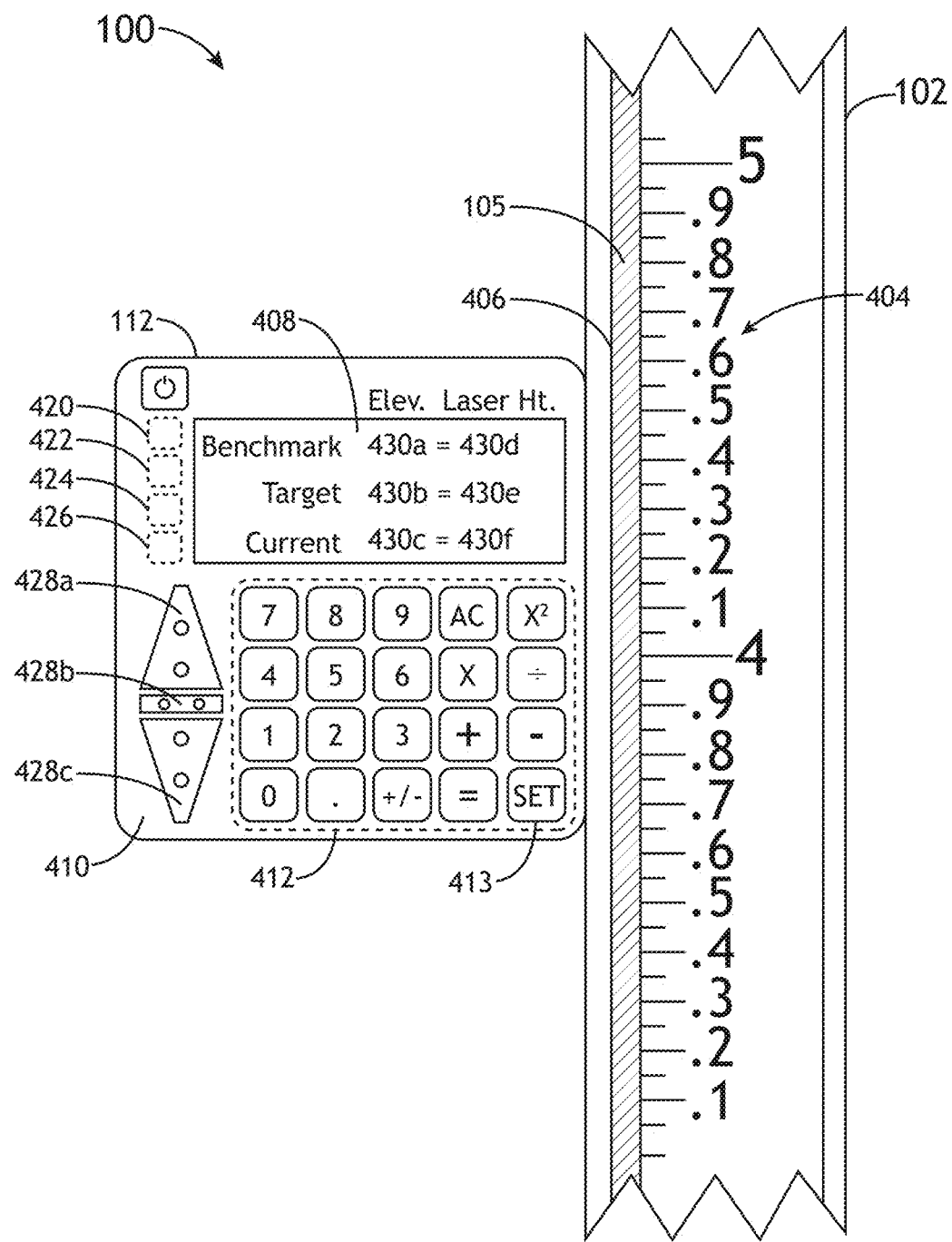

FIGS. 3A-3B illustrate various schematic views of the sensor rod assembly 100, in accordance with one or more embodiments of the present disclosure.

In one embodiment, the assembly 100 includes the elevation rod 102. In another embodiment, markings 404 in increments of 100th of a foot (or any other selected increment or unit of measure (meters)) are affixed to the elevation rod 102. For example, the markings 404 may range from, but are not limited to, zero feet to six feet. Additionally, the lines may be etched onto the elevation rod 102. Alternatively, the lines may be formed via printing, painting, drawing, affixing a printed sticker on a printed sticker, or any other method of marking currently known in the art. It is noted the markings 404 may be in other increments including, but not limited to, 16th of a foot, 10th of a foot, or quarter-foot and may be provided in any other unit system (e.g., metric).

It is noted that for purpose of the present disclosure, all elevations are to be understood as being "above sea level." For example, "1000.00 feet" is meant to be understood as "1000.00 feet above sea level." It is noted, however, that this convention is provided merely for purposes of illustration and should not be interpreted as a limitation on the scope of the present disclosure. In general, an elevation may be defined as any height above a reference point.

In one embodiment, the elevation rod 102 includes a set of laser sensors 105. For example, the set of laser sensors 105 may include any of the sensor devices 105 described previously herein configured in any many described previously herein. For example, the elevation rod 102 may include a sensor every 1/100th of a foot (e.g. a six-foot elevation rod includes 600 sensors). It is noted the plurality of laser sensors 105 may be spaced in other increments including, but not limited to, 1/16 of a foot, 1/10 of a foot, 1/4 of a foot, meters, or any increment of a meter. In another embodiment, the plurality of laser sensors 105 may be housed on a pre-fabricated grid array.

In another embodiment, the laser sensors 105 are housed behind a material that selectively transmits a laser beam emitted from a laser level while blocking other light from other sources (e.g. sunlight, halogen light, fluorescent light, compact fluorescent light (CFL), LED light, or incandescent light). In this regard, the material may act like a bandpass filter selected to pass the laser illumination, while blocking illumination of other wavelengths.

In another embodiment, the rod 102 includes a set of lights 406 running the length of the rod 102. For example, the set of lights may include, but are not limited to, a set of LEDs. In one embodiment, the set of lights 406 are communicatively coupled to the one more processors 108 of controller 106 such that the one or more processors 108 control the ON/OFF state of the lights. In this regard, upon a laser beam detection, the one or more processors 108 may cause one or more lights proximate to the position of detection to illuminate, serving as a visual marked to a user. Further, the light may remain on until turned off by a user so as to provide a semi-permanent marker of the last laser level detection.

As discussed previously herein, the assembly 100 includes a user interface 112. The user interface 112 may include a user input device 410 and display 408 as discussed previously herein.

In one embodiment, as shown in FIG. 3B, the user input device 410 may include, but is not limited to, a numeric keypad 412, the numeric keypad including basic calculator functions. In another embodiment, the user input device 410 may include a SET button 413.

In another embodiment, the information displayed on the display device 408 may include one or more input values including, but not limited to, a benchmark elevation 430a, a target elevation 430b, and a laser-sensor registered elevation 430c. For instance, information displayed on the display device 408 may further include one or more calculated or determined values including, but not limited to, a laser height benchmark 430d, a laser height target 430e, and a laser-sensor registered current height 430f, a cut/fill amount (not shown in display 408) or a slope instruction (not shown in display 410). It is noted that the controller 106 may automatically calculate and display the values 430d, 430e, and 430f for the inputted or measured values 430a, 430b, and 430c, respectively.

In another embodiment, the input values 430a and 430b may be independently offered by the user. For example, the user may input the benchmark elevation 430a or the target elevation 430b. In another embodiment, the user input may be a selection and/or instructions in response to data displayed to the user via the display device 408. For example, the user may utilize the user input device 410 to calculate elevations based on the information displayed on the display device 408, where the calculations are completed by the one or more processors 108.

In another embodiment, the user interface 112 includes a set of input buttons 420, 422, 424 and 426. In one embodiment, pressing the button 420 may allow a user to input the benchmark elevation 430a. In another embodiment, the user interface 112 includes a button 422. For example, pressing the button 422 allows the user to input and/or calculate the target elevation 430b. In another embodiment, the user interface 112 includes a button 424. For example, pressing the button 424 allows the user to receive a cut/fill amount based on the target elevation 430b and the current elevation, whereby the current elevation is determined by the one or more processors 108 based on the measured current height (via sensor devices 105). It is noted herein that the "cut" amount is the amount of ground or surface that must be removed from the current elevation to achieve the target elevation, while the "fill" amount is the amount of ground or surface that must be added to the current elevation to achieve the target elevation.

In another embodiment, the user interface 112 includes a button 426. For example, pressing the button 426 prompts the user to input elevation and distance data to allow the controller 106 to calculate a slope and/or slope instructions. For example, pressing the slope button 426 may prompt the controller 106 to register the current elevation and then request an additional elevation from the user. In addition, the slope function may prompt the controller to register the current position (e.g., register GPS coordinates) and request an additional position. Based on these two pairs of values the controller 106 may calculate a slope. In another embodiment, the user interface 112 may request the number of measurements to take between the two positions, which may be entered by the user via the user interface 410.

In another embodiment, the user interface 112 includes a set of lights 428a, 428b, and/or 428c. For example, lights 428a, 428b, and/or 428c indicate the direction in which the elevation rod 102 must move to reach the target elevation. For instance, light 428a may inform the user the current laser-sensor registered elevation 430c is lower than the target elevation 430b and that the rod 102 needs to be raised. Additionally, light 428b may illuminate in order to inform the user the current laser-sensor registered elevation 430c is higher than the target elevation 430b and that the rod 102 needs to be lowered. Further, light 428c may inform the user that the current laser-sensor registered elevation 430c matches the target elevation 430b.

In another embodiment, the user interface 112 may include a sound emitter for providing one or more alerts to the user. For example, as the current laser elevation approaches the target elevation, the controller 106 may direct the user interface 112 to emit an audible alert (e.g., voice, beep, etc.) to warn the user the current laser-sensor registered elevation 430c is approaching the target elevation 430b.

Figure 3C:
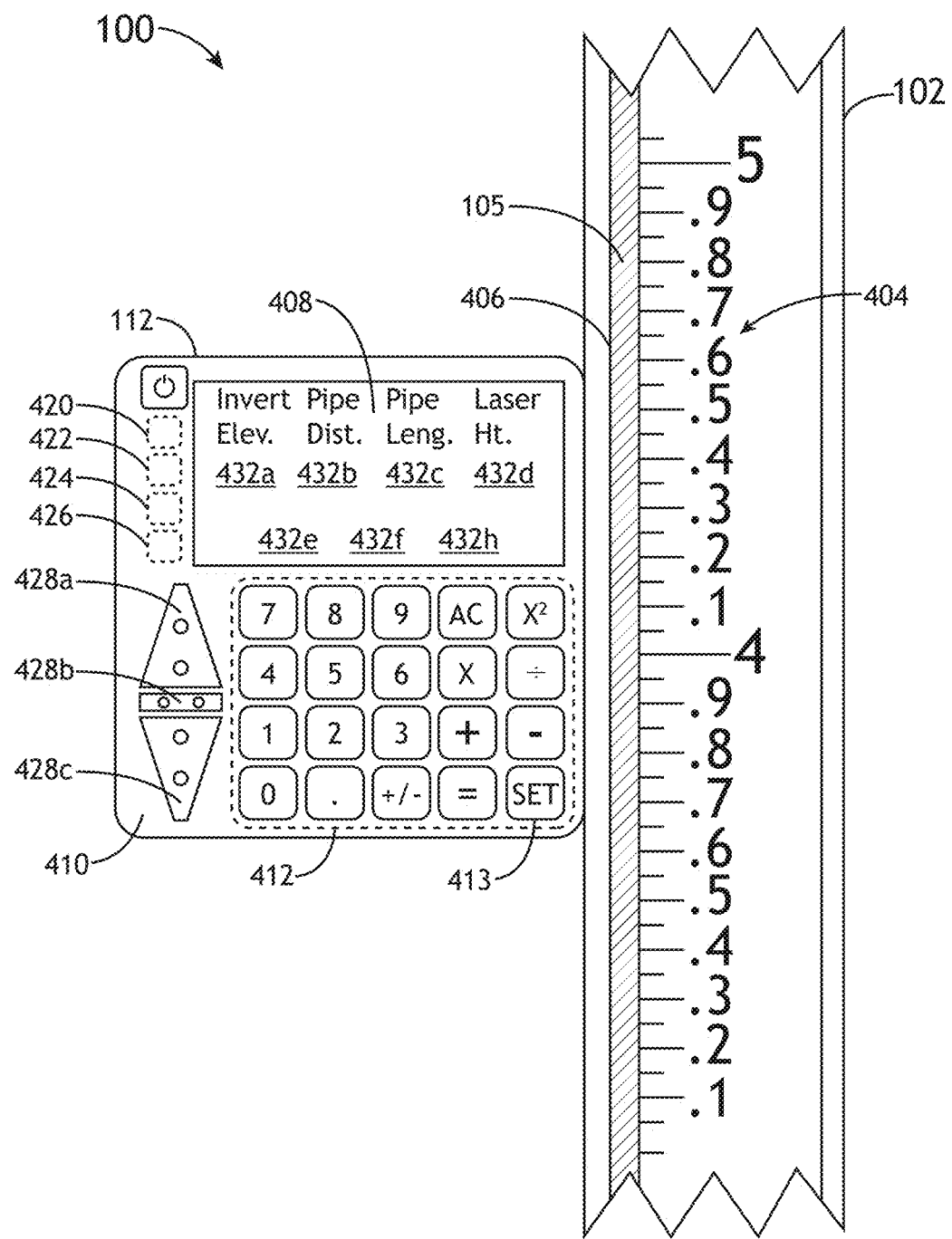

FIG. 3C illustrates a schematic view for an implementation of a slope calculation, in accordance with one or more embodiments of the present disclosure. In one embodiment, the system 100 may be automated for providing pipe-laying instructions. It is noted that the following example is provided merely for illustrative purposes and should not be interpreted a limitation on the scope of the present disclosure. It is noted that system may be adapted to provide grading instructions in any context. By way of example, in the case of pipe grading, the values displayed on the display device 410 may include, but are not limited to, a set of invert elevation values 432b, a set of pipe distance values 432c, a set of pipe length values 432d, and a set of current height values 432e. It is noted that the one or more of the set of invert elevation values 432b, the set of pipe distance values 432c, the set of pipe length values 432d, and the set of current height values 432e are inter-related. For example, one or more of the values 432b through 432e may be used for calculating the elevation grading necessary to lay a pipe at a project site. The set of values 432b-432e may be displayed in feet, inches, yards, centimeters, meters or any other unit of measure.

In one embodiment, the user inputs a pipe length into the controller 106 via user interface 112. In another embodiment, the user inputs a pipe section length into the controller 106 via user interface 112. In another embodiment, a set of counting values 432a are displayed on display 408 to give the user an indication of which section he is currently considering. For example, where the pipe length is 100.00 feet and the pipe section length is 8.00 feet, the 100-foot pipe is comprised of twelve 8-foot sections and one 4-foot section for a total of thirteen sections. Thus, the plurality of counting values 432a on display device 408 may count from position zero (indicating the initial position of the pipe—the beginning of pipe section 1 at 0.00 feet) and position thirteen (indicating the final position of the pipe—the end of pipe section 13 at 100.00 feet). It is noted herein that pipe length sections may alternatively be lengths other than 8.00 feet.

In another embodiment, the user interface 112 displays the initial laser-sensor registered height value based on a laser reading measured by the sensor devices 105 on the sensor rod 102. For example, the user interface 112 may display the laser reading measurement as the position zero value of the set of height values. In another embodiment, the user inputs a starting elevation value for the pipe into the controller 106 via the user interface 112. For example, the controller 106 may display the starting elevation value as the position zero value of the set of invert elevation values 432b. Additionally, the starting elevation value may correspond to a measure elevation value acquired with the sensor devices 105. In another embodiment, the user inputs a final elevation value for the pipe into the controller 106 via the user interface 112. Further, controller 106 may display the final elevation value as the final position value of the set of invert elevation values 432b.

In another embodiment, the controller 106 calculates one or more of the set of invert elevation values 432b, the set of pipe distance values 432c, the set of pipe length values 432d, and the plurality of the current height values 432e based on one or more of the input pipe length, pipe section length, laser-sensor registered current height, starting elevation, and ending elevation values.

By way of example, in a case where the pipe length is 100.00 feet, the pipe section length is 8.00 feet, the laser-sensor registered stick current height is 1.00 foot, the starting elevation is 1000.00 feet, and the ending elevation is 995.00 feet, the display 408 may display the following values for 432a-432e:

| 432a | 432b | 432c | 432d | 432e |
|---|---|---|---|---|
| 0 | 1000.00 | 0 | 8 | 1.00 |
| 1 | 999.60 | 8 | 8 | 1.40 |
| 2 | 999.20 | 16 | 8 | 1.80 |
| 3 | 998.80 | 24 | 8 | 2.20 |
| 4 | 998.40 | 32 | 8 | 2.60 |
| 5 | 998.00 | 40 | 8 | 3.00 |
| 6 | 997.60 | 48 | 8 | 3.40 |
| 7 | 997.20 | 56 | 8 | 3.80 |
| 8 | 996.80 | 64 | 8 | 4.20 |
| 9 | 996.40 | 72 | 8 | 4.60 |
| 10 | 996.00 | 80 | 8 | 5.00 |
| 11 | 995.60 | 88 | 8 | 5.40 |
| 12 | 995.20 | 96 | 8 | 5.80 |
| 13 | 995.00 | 100 | 4 | 6.00 |

It is noted herein that the controller 106 may modify the calculations necessary to fill in the set of values as necessary to accommodate a pipe length that is not divisible by the input pipe section length value. For example, as shown above, the calculations to the determine the values 432b-432e for the position 13 value of 432a would be modified by the controller 106 to take into account the last pipe section, pipe section 13, being only 4.00 feet in length.

In another embodiment, the controller 106 allows the user to scroll through the set of values displayed on the display device 408 and find the appropriate elevation to lay pipe or a pipe section. For example, the user would know the first pipe section would start at 1000.00 feet, the second pipe section would start at 999.60 feet, the third pipe section would start at 999.20 feet, and the like.

In another embodiment, the controller 106 may calculate and display an invert elevation 432g and a current height 432h for a user-inputted current pipe length based on the starting elevation and ending elevation. For example, where the pipe length is 100.00 feet, the pipe section length is 8.00 feet, the laser-sensor registered current height is 1.00 foot, the starting elevation is 1000.00 feet, the ending elevation is 995.00 feet, and the current pipe length 432f is 28.00 feet, the display device 408 may display the following values for 432a-432h:

| 432a | 432b | 432c | 432d | 432e |
|---|---|---|---|---|
| 0 | 1000.00 | 0 | 8 | 1.00 |
| 1 | 999.60 | 8 | 8 | 1.40 |
| 2 | 999.20 | 16 | 8 | 1.80 |
| 3 | 998.80 | 24 | 8 | 2.20 |
| 4 | 998.40 | 32 | 8 | 2.60 |
| 5 | 998.00 | 40 | 8 | 3.00 |
| 6 | 997.60 | 48 | 8 | 3.40 |
| 7 | 997.20 | 56 | 8 | 3.80 |
| 8 | 996.80 | 64 | 8 | 4.20 |
| 9 | 996.40 | 72 | 8 | 4.60 |
| 10 | 996.00 | 80 | 8 | 5.00 |
| 11 | 995.60 | 88 | 8 | 5.40 |
| 12 | 995.20 | 96 | 8 | 5.80 |
| 13 | 995.00 | 100 | 4 | 6.00 |
| 432f 28 | | 432g 998.60 | | 432h 2.40 |

In another embodiment, the controller 106 includes an inputted pipe thickness value for the set of values 432a-432h. For example, the values displayed on the display device 408 may be calculated so as to compensate for the pipe diameter to help the user take the pipe thickness into account when grading the pipe bed on the project site. For instance, where the pipe length is 100.00 feet, the pipe section length is 8.00 feet, the laser-sensor registered stick height is 1.00 foot, the starting elevation is 1000.00 feet, the ending elevation is 995.00 feet, the current pipe length 432e is 28.00 feet, and a pipe has a thickness of 2 inches, or 0.16 feet, the controller 106 cause display device 408 to display the following values for 432a-432h:

| 432a | 432b | 432c | 432d | 432e |
|------|------|------|------|------|
| 0 | 999.84 | 0 | 8 | 1.16 |
| 1 | 999.44 | 8 | 8 | 1.56 |
| 2 | 999.04 | 16 | 8 | 1.96 |
| 3 | 998.64 | 24 | 8 | 2.36 |
| 4 | 998.24 | 32 | 8 | 2.76 |
| 5 | 997.84 | 40 | 8 | 3.16 |
| 6 | 997.44 | 48 | 8 | 3.56 |
| 7 | 997.04 | 56 | 8 | 3.96 |
| 8 | 996.64 | 64 | 8 | 4.36 |
| 9 | 996.24 | 72 | 8 | 4.76 |
| 10 | 995.84 | 80 | 8 | 5.16 |
| 11 | 995.44 | 88 | 8 | 5.56 |
| 12 | 995.04 | 96 | 8 | 5.96 |
| 13 | 994.84 | 100 | 4 | 6.16 |
| <u>432f</u> 28 | | <u>432g</u> 998.44 | | <u>432h</u> 2.56 |

In another embodiment, the controller 106 may calculate the elevation of the top of the pipe with the given pipe diameter and pipe thickness. It is noted herein the display device 408 may or may not display the pipe length, pipe section length, and the inputted pipe diameter and pipe thickness values with a dedicated display value similar to 432a-432h.

It is further noted herein that the controller 106 may display the set of values 430a-430f on one graphical window of the display device 408 and display the set of values 432a-432h on a second graphical window of the display device 408, and/or one or more other data sets (e.g., cut/fill instructions) one another graphical window, the graphical windows interchangeable by means of the user input device 410 and the buttons 420, 422, 424, and 426 or another user input device on the controller 106. It is further noted herein that the controller 106 may display the set of values 430a-430f and the set of values 432a-432h on the same graphical window.

Figure 3D:
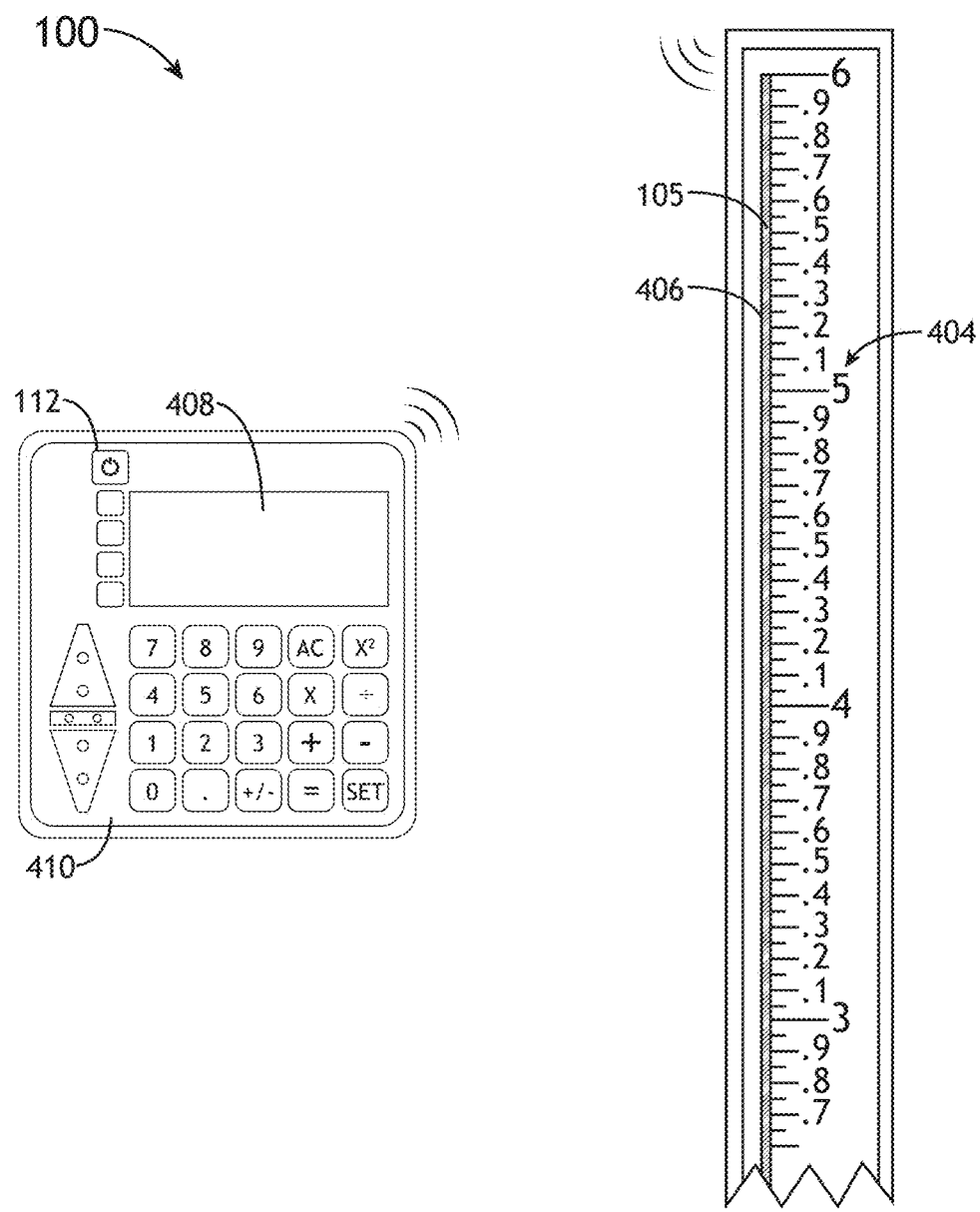

FIG. 3D illustrates a schematic view of the sensor rod assembly 100 including a wireless user interface device 112, in accordance with one or more embodiments of the present disclosure. As discussed previously herein, the user interface device 112 may be embodied in a wireless or mobile device 120, such as, but not limited to, a smartphone, a tablet, a laptop, an ultrabook, a PDA or a dedicated mobile device. In this embodiment, the various buttons and user interface elements may be implemented as "soft" buttons displayed on a touchscreen display. It is noted that the various functions, features and components described previously herein with respect to FIGS. 3A-3C should be interpreted to extend to FIG. 3D unless otherwise noted.

Figure 4:
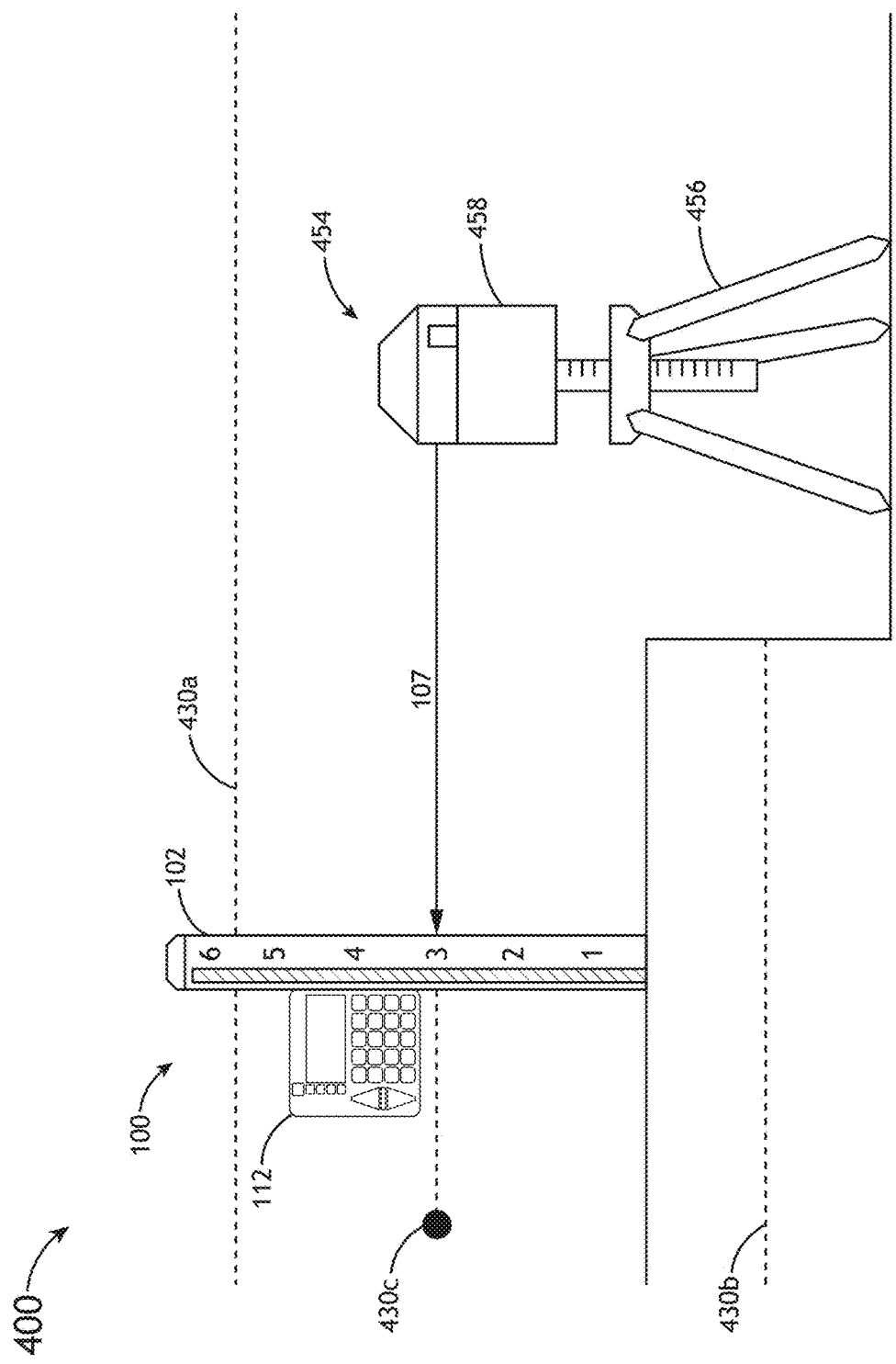

FIG. 4 illustrates a conceptual view 400 of an implementation of the sensor rod assembly 100, in accordance with one or more embodiments of the present disclosure.

In one embodiment, the system 100 includes the sensor rod assembly 100. For example, the sensor rod assembly 100 includes the sensor rod 102. Additionally, the sensor rod assembly 100 includes the controller 106. In another embodiment, the system 100 receives the benchmark elevation 430a. In another embodiment, the system 100 receives the target elevation 430b. It is noted that the target elevation height 430b may alternatively be a reference plane.

In one embodiment, the system 100 includes a laser level assembly 454. In another embodiment, the laser level assembly 454 includes a support device 456. For example, the support device 456 may be a tripod. Alternatively, the support device 456 may include, but is not limited to, a pre-fabricated device, a custom-built device specific to the project site, or a temporary structure utilized when desired, such as a box, a tailgate, or a truck bed.

In another embodiment, the laser level assembly 454 includes a laser 458. For example, the laser 458 may be a rotary laser. Alternatively, the laser 458 may be either of a fixed single-point or fixed multi-point laser. In another embodiment, the laser 458 is coupled to the support device 456. It is contemplated, however, that the support device 458 may not be necessary, and that the laser 458 may instead be placed directly on the ground. In another embodiment, the laser 458 emits a laser beam 107 at the laser-sensor registered elevation 452.

In one embodiment, the laser level assembly 454 is set up and the laser beam 107 is positioned within a range including a known benchmark 430a (e.g., 1000.00 feet) and a target elevation 430b (e.g., 998.50 feet). In another embodiment, the user sets up the sensor rod assembly 100 at a known elevation. For example, the known elevation may be the benchmark elevation, an elevation recorded on an engineering drawing, or another elevation at the project site.

In another embodiment, the user presses the button 420 on the controller 106, enters the value benchmark elevation (e.g., 1000.00) and presses a SET button 413 on the user input device 410 until the controller 106 displays the value as benchmark elevation 430a. In another embodiment, the controller 106 also displays the benchmark laser height for value 130d (e.g., 2.00 feet).

In another embodiment, the user presses the button 422 on the controller 106, enters the target elevation value (e.g., 998.50), and presses the SET button 413 on the user input device 410 until the controller 106 displays the value as target elevation 430b. In an alternative embodiment, in the case of a benchmark elevation of 1000 feet and a target elevation of 998.5 feet, the target elevation 130b may be inputted by the user pressing button 422 and entering "1000.00-1.5" into the user input device 410 before pressing the SET button 413. Upon setting value 430b as the target elevation, the controller 106 will calculate and display the target laser height needed to achieve the target elevation (e.g., 3.50 feet for value 430e).

In another embodiment, the sensor rod assembly 100 registers the position/height of the laser beam 107 laser from the laser level assembly 454, recording that value as the current laser-sensor registered height 430f. In another embodiment, upon registering value 430f, the controller 106 may calculate and display the current laser-sensor registered elevation 430c (e.g., 999.25 feet).

It is noted that the sensor rod 102 may have a length other than six feet. Additionally, the sensor rod 102 may include telescoping capabilities instead of being a rigid pole, allowing for greater ease of storage and carrying. Further, the sensor rod 102 may include coupling components (e.g. male/female plug, screw-in socket, or snap-fit components) that allows multiple sensor rods 102 to be coupled together. When multiple elevation rods 102 are coupled together the internal circuitry of the rods 102 may also be connected together, giving the controller 106 additional elevation rod length for use in determining the current elevation.

In another embodiment, the sensor rod 102 may be mountable to a machine or machinery. For example, the sensor rod 102 may be mountable to an excavator, a grader, and the like. In this embodiment, the controller 106 associated with and mounted on the sensor rod 102 may be paired (e.g., BLUETOOTH, LEBT, WiFi, and the like) to a mobile device or a device disposed within a cab of the particular machinery. In this regard, all of the embodiments, components, and functions described previously herein may be extended to a machine-mounted configuration of the present disclosure. For instance, the sensor rod 102 may be coupled to a bucket on a loader, whereby the controller 106 communicates with the user interface 112 of a mobile device 120 in the cab of the loader with the operator. Where determining an elevation is desired, the operator may set the bucket on the ground, reading the current laser-sensor registered height on the user interface 112 in the cab. The operator of the loader may repeat this process, as the laser height is never altered. Thus, measuring elevation for a project site may be completed more efficiently by a single individual (i.e. the operator of the loader). It is further contemplated that such a set-up would allow the operator of the loader to grade the project site as necessary more easily, as the necessary altering of elevations would be readily apparent from the sensor rod readings on the user interface 112 in the cab.

Figure 5:
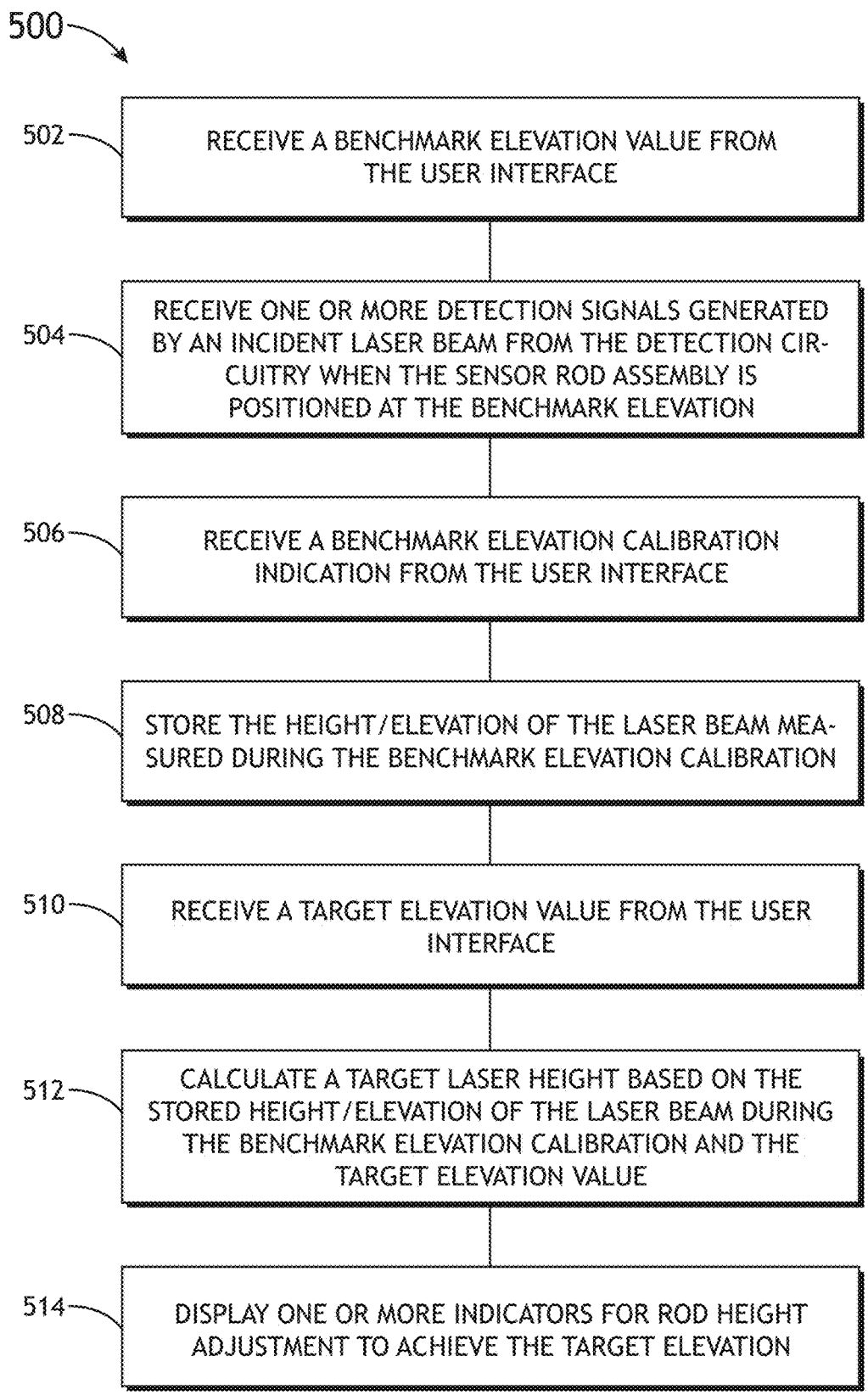

FIG. 5 illustrates a process flow diagram depicting a method 500 for achieving target elevations, in accordance with one or more embodiments of the present disclosure. It is noted herein that the steps of method 500 may be implemented all or in part by the system 100. It is further recognized, however, that the method 500 is not limited to the system 100 in that additional or alternative system-level embodiments may carry out all or part of the steps of method 500.

In step 502, the method receives a benchmark elevation value input from the user interface. In step 504, the method receives, from the detection circuitry, one or more detection signals generated by an incident laser beam when the sensor rod assembly is positioned at the benchmark elevation. In step 506, the method receives a benchmark elevation calibration indication from the user interface. In step 508, the method stores a parameter indicative of at least one of the height or elevation of the laser beam measured during the benchmark elevation calibration. In step 510, the method receives a target elevation value input from the user interface. In step 512, the method calculates a target laser height based on the stored parameter indicative of at least one of the height or elevation of the laser beam during the benchmark elevation calibration and the inputted target elevation value. In step 514, the method displays, on the user interface, one or more indicators for rod height adjustment of the sensor rod 102 to achieve the target elevation.

Figure 6:
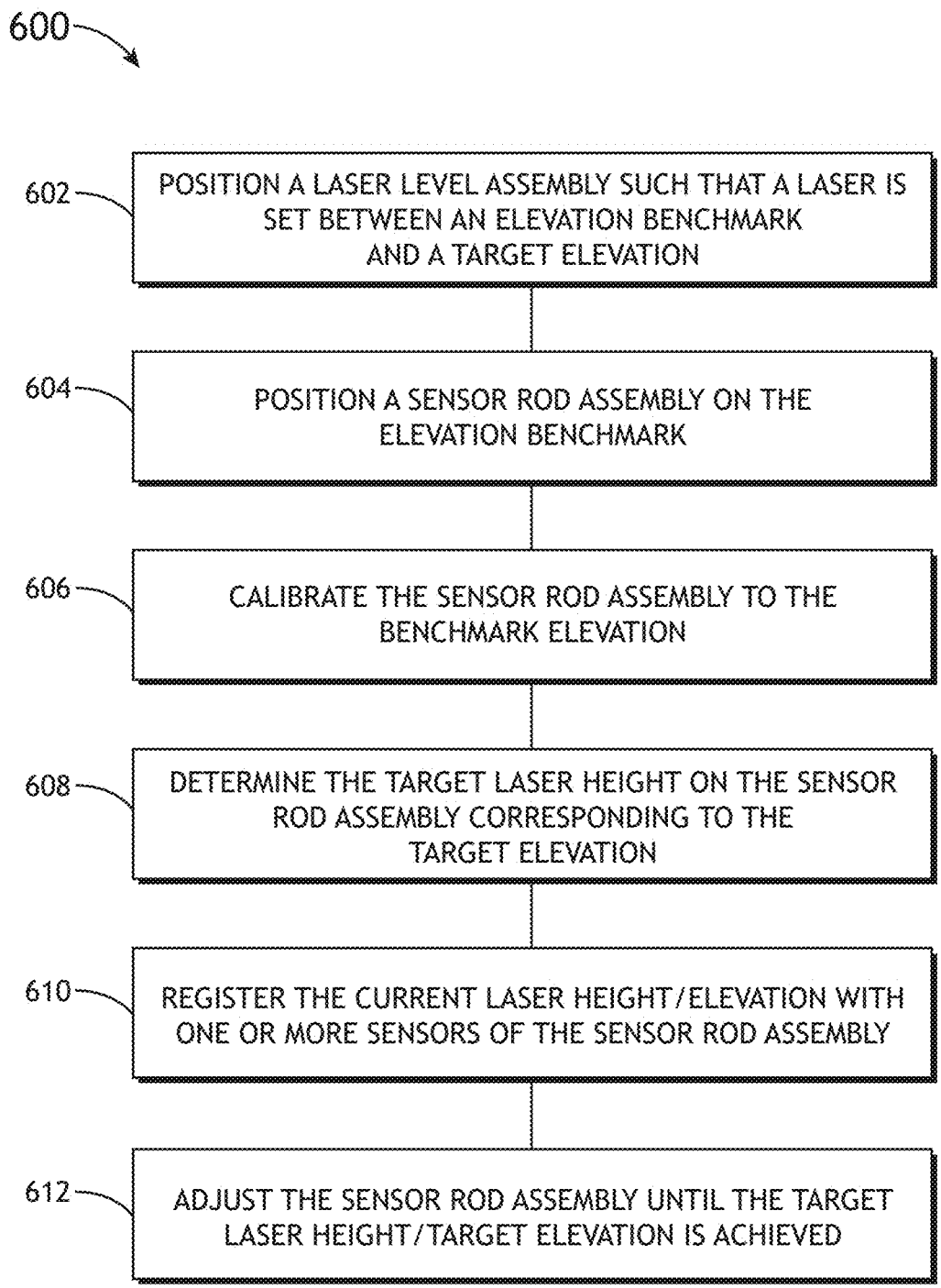

FIG. 6 illustrates a process flow diagram depicting a method 600 for measuring elevations at a project site, in accordance with one or more embodiments of the present disclosure. It is noted herein that the steps of method 600 may be implemented all or in part by the system 100. It is further recognized, however, that the method 600 is not limited to the system 100 in that additional or alternative system-level embodiments may carry out all or part of the steps of method 600.

In step 602, a laser level assembly is positioned and a laser is set between an elevation benchmark and a target elevation. For example, the laser may be initially set based on sight approximation. Once positioned, the laser level assembly is turned on, allowing time for the laser to self-level.

In step 604, a sensor rod assembly 102 is positioned on a known elevation or the benchmark elevation. For example, the known elevation and/or the benchmark elevation may be recorded on an engineering drawing or correspond to another elevation at the project site. Once positioned, the sensor rod assembly 100 is turned on with a power button, the power button either on the sensor rod or the controller 106.

In step 606, the sensor rod assembly 100 is calibrated to the benchmark elevation. In one embodiment, the user presses a benchmark elevation input button on the controller 106, enters the benchmark elevation on a user interface 112, and presses a SET button until the user interface 112 displays the benchmark elevation value. In another embodiment, the controller 106 calculates and displays a corresponding benchmark laser height value.

In step 608, the target laser height on the sensor rod assembly corresponding to the target elevation is determined. In one embodiment, the user presses a target elevation input button on the user interface 112, enters the target elevation on the user input device, and presses the SET button until the user interface 112 displays the target elevation value. In another embodiment, pressing the target the elevation input button will alternatively allow the user to calculate the target elevation based upon a given elevation via user input device commands, should the user be unsure of the target elevation. In another embodiment, the controller 106 calculates and displays a corresponding target laser height value necessary to achieve the target elevation value.

In step 610, a laser elevation or height is registered with the set of sensor devices 105. In one embodiment, the controller 106 may display a current laser-sensor registered height received from the sensor rod 102. In another embodiment, the controller 106 calculates and displays a corresponding laser-sensor registered elevation once the laser-sensor registered height is registered.

In step 612, the controller 106 provides instructions for adjusting the sensor rod 102 until the target elevation/height is achieved. For example, the sensor rod 102 may be raised or lowered (e.g., by adding or removing ground beneath the rod) until the target elevation is registered. In one embodiment, the controller 106 may activate a light indicating the direction the sensor rod assembly should be adjusted. In another embodiment, the controller 106 may emit a sound indicating the laser-sensor registered elevation is in relative proximity to the target elevation.

While implementations of methods 500, 600 are discussed herein, it is further contemplated that various steps of methods 500, 600 may be included, excluded, rearranged, and/or implemented in many ways without departing from the essence of the present disclosure. Accordingly, the foregoing embodiments and implementations of methods 500, 600 are included by way of example only and are not intended to limit the present disclosure in any way.

All of the methods described herein may include storing results of one or more steps of the method embodiments in a memory medium. The results may include any of the results described herein and may be stored in any manner known in the art. The memory medium may include any memory medium described herein or any other suitable memory medium known in the art. After the results have been stored, the results can be accessed in the memory medium and used by any of the method or system embodiments described herein, formatted for display to a user, used by another software module, method, or system, etc. Furthermore, the results may be stored "permanently," "semi-permanently," temporarily, or for some period of time. For example, the memory medium may be random access memory (RAM), and the results may not necessarily persist indefinitely in the memory medium.

It is further contemplated that each of the embodiments of the method described above may include any other step(s) of any other method(s) described herein. In addition, each of the embodiments of the method described above may be performed by any of the systems described herein.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A sensor rod apparatus comprising:

a sensor rod assembly including a plurality of sensor devices;

detection circuitry coupled to the plurality of sensor devices, wherein the detection circuitry is configured to determine a position of an incident laser beam on the sensor rod assembly, wherein the detection circuitry is disposed on the sensor rod assembly;

a user interface; and a controller including one or more processors, the one or more processors communicatively coupled to the detection circuitry and the user interface, the one or more processors configured to execute a set of program instructions configured to cause the one or more processors to:

receive a benchmark elevation value input from the user interface;
receive, from the detection circuitry, one or more detection signals generated by an incident laser beam when the sensor rod assembly is positioned at the benchmark elevation;
receive a benchmark elevation calibration indication from the user interface;
store a parameter indicative of at least one of a height or elevation of the incident laser beam measured during the benchmark elevation calibration;
receive a target elevation value input from the user interface;
calculate a target laser height based on the stored parameter indicative of at least one of the height or elevation of the laser beam during the benchmark elevation calibration and the inputted target elevation value; and
display, on the user interface, one or more indicators for rod height adjustment of the sensor rod assembly to achieve the target elevation.

2. The apparatus of claim 1, wherein the displaying one or more indicators for rod height adjustment to achieve the target laser elevation comprises:
displaying the target laser height on the user interface to achieve the target elevation.

3. The apparatus of claim 1, wherein the displaying one or more indicators for rod height adjustment to achieve the target laser elevation comprises:
displaying an arrow indicative of the direction of adjustment to achieve the target elevation.

4. The apparatus of claim 1, wherein the one or more processors are further configured to:
provide at least one of a visual or audio alert when the target elevation is achieved.

5. The apparatus of claim 1, further comprising:
a plurality of optical elements configured to focus laser light onto one or more of the sensor devices.

6. The apparatus of claim 5, wherein the plurality of optical elements comprises:
a lens array.

7. The apparatus of claim 1, wherein at least some of the sensor devices comprise:
a photodiode.

8. The apparatus of claim 1, wherein the plurality of sensor devices are arranged in a linear pattern along the sensor rod assembly.

9. The apparatus of claim 1, wherein the plurality of sensor devices are arranged in a staggered pattern along the sensor rod assembly.

10. The apparatus of claim 1, wherein the user interface and the controller form an integrated unit.

11. The apparatus of claim 1, wherein the user interface is included in a mobile device, wherein the one or more processors of the controller are communicatively coupled to the mobile device via a wireless connection.

12. Apparatus of claim 1, wherein the controller is mechanically coupled to a portion of the sensor rod assembly.

13. The apparatus of claim 1, wherein the controller is separated from the sensor rod assembly.

14. The apparatus of claim 1, wherein the controller is reversibly attachable to the sensor rod assembly.

15. The apparatus of claim 1, wherein the controller is configured to determine a location of the sensor rod assembly via one or more signals from a global position system.

16. The apparatus of claim 1, wherein the controller is configured to communicate with a server.

17. The apparatus of claim 1, wherein the sensor rod is mountable to a machine.

18. A sensor rod apparatus comprising:
a sensor rod assembly including a plurality of sensor devices;
detection circuitry coupled to the plurality of sensor devices, wherein the detection circuitry is configured to determine a position of an incident laser beam from a laser level on the sensor rod assembly, wherein the detection circuitry is disposed on the sensor rod assembly;
a controller including one or more processors, the one or more processors communicatively coupled to the detection circuitry and one or more mobile devices, the one or more processors configured to execute a set of program instructions configured to cause the one or more processors to:
receive a benchmark elevation value input from a user interface of the one or more mobile devices;
receive, from the detection circuitry, one or more detection signals generated by the incident laser beam when the sensor rod assembly is positioned at the benchmark elevation;
receive a benchmark elevation calibration indication from the user interface;
store a parameter indicative of at least one of a height or elevation of the incident laser beam measured during the benchmark elevation calibration;
receive a target elevation value input from the user interface;
calculate a target laser height based on the stored parameter indicative of at least one of the height or elevation of the incident laser beam during the benchmark elevation calibration and the inputted target elevation value; and
display, on the user interface, one or more indicators for rod height adjustment of the sensor rod assembly to achieve the target elevation.

19. The apparatus of claim 18, wherein at least one of the controller or the one or more mobile devices are configured to determine a location of the sensor rod assembly via one or more signals from a global position system.

20. The apparatus of claim 18, wherein at least one of the controller or the one or more mobile devices are configured to communicate with a server.

21. The apparatus of claim 18, wherein the sensor rod is mountable to a machine.

22. A sensor rod apparatus comprising:
a controller including one or more processors, the one or more processors communicatively couplable to detection circuitry of a sensor rod assembly, the one or more processors configured to execute a set of program instructions configured to cause the one or more processors to:
receive a benchmark elevation value input from a user interface;
receive, from the detection circuitry, one or more detection signals generated by the incident laser beam when the sensor rod assembly is positioned at the benchmark elevation;
receive a benchmark elevation calibration indication from the user interface;
store a parameter indicative of at least one of a height or elevation of the incident laser beam measured during the benchmark elevation calibration;

receive a target elevation value input from the user interface;

calculate a target laser height based on the stored parameter indicative of at least one of the height or elevation of the incident laser beam during the benchmark elevation calibration and the inputted target elevation value; and display, on the user interface, one or more indicators for rod height adjustment of the sensor rod assembly to achieve the target elevation.

23. The apparatus of claim 22, wherein the controller is configured to determine a location of the sensor rod assembly via one or more signals from a global position system.

24. The apparatus of claim 22, wherein the controller is configured to communicate with a server.

* * * * *